(12) United States Patent
Huston et al.

(10) Patent No.: US 11,087,345 B2
(45) Date of Patent: *Aug. 10, 2021

(54) SYSTEM AND METHOD FOR CREATING CONTENT FOR AN EVENT USING A SOCIAL NETWORK

(71) Applicants:Charles D. Huston, Austin, TX (US); Chris Coleman, Austin, TX (US)

(72) Inventors: Charles D. Huston, Austin, TX (US); Chris Coleman, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/668,143

(22) Filed: Oct. 30, 2019

(65) Prior Publication Data

US 2020/0061435 A1 Feb. 27, 2020

Related U.S. Application Data

(63) Continuation of application No. 15/097,711, filed on Apr. 13, 2016, now Pat. No. 10,512,832, which is a
(Continued)

(51) Int. Cl.
*G06Q 30/02* (2012.01)
*H04W 4/21* (2018.01)
(Continued)

(52) U.S. Cl.
CPC ..... *G06Q 30/0207* (2013.01); *A63B 69/3658* (2013.01); *G06Q 30/0241* (2013.01);
(Continued)

(58) Field of Classification Search
None
See application file for complete search history.

(56) References Cited

U.S. PATENT DOCUMENTS 5,364,093 A 11/1994 Huston et al.
5,802,492 A 9/1998 DeLorme et al.
(Continued)

FOREIGN PATENT DOCUMENTS

EP 1077421 2/2001
EP 1113669 7/2001
(Continued)

OTHER PUBLICATIONS

"Using Virtual Reality to Analyze Sports Performance", by Benoit Bideau, Richard Kulpa, Nicolas Nignais, Sebastien Brault, and Franck Multon, IEEE Computer Graphics and Applications, Mar./Apr. 2010, pp. 14-21. (Year: 2010).*
(Continued)

*Primary Examiner* — James A Thompson
(74) *Attorney, Agent, or Firm* — Egan, Enders & Huston LLP.

(57) ABSTRACT

A system and method for creating content such as artificial reality (AR) messages at an event, particularly among members on a social network, thereby enhancing and expanding the event experience. Typically, a participant shares an event with spectators, such as friends or a subset of friends in the participant's social network. The AR message may include geo-referenced artificial reality words, products or symbols and appear in a perspective view of the event to the participant or spectators. In addition to creating an active gallery for an event, messages, audio and video can be exchanged among participants and spectators, and virtual goods, money, bets, applause, other feedback, and donations exchanged.

33 Claims, 12 Drawing Sheets

Related U.S. Application Data continuation of application No. 14/037,642, filed on Sep. 26, 2013, now Pat. No. 9,498,694, which is a continuation of application No. 13/605,174, filed on Sep. 6, 2012, now Pat. No. 8,589,488, which is a continuation of application No. 13/182,930, filed on Jul. 14, 2011, now Pat. No. 8,933,967, and a continuation of application No. 13/152,476, filed on Jun. 3, 2011, now abandoned, said application No. 13/182,930 is a continuation-in-part of application No. 12/111,688, filed on Apr. 29, 2008, now Pat. No. 9,445,225, which is a continuation-in-part of application No. 11/875,414, filed on Oct. 19, 2007, now Pat. No. 8,249,626, which is a continuation-in-part of application No. 11/624,998, filed on Jan. 19, 2007, now Pat. No. 8,275,397, which is a continuation-in-part of application No. 11/456,715, filed on Jul. 11, 2006, now Pat. No. 7,855,638, and a continuation-in-part of application No. 11/456,723, filed on Jul. 11, 2006, now Pat. No. 7,518,501.

(60) Provisional application No. 60/699,205, filed on Jul. 14, 2005.

(51) Int. Cl.
| | |
|---|---|
| *H04W 4/80* | (2018.01) |
| *H04W 4/029* | (2018.01) |
| *H04L 29/08* | (2006.01) |
| *H04L 12/58* | (2006.01) |
| *G06Q 50/00* | (2012.01) |
| *G06T 19/00* | (2011.01) |
| *A63B 69/36* | (2006.01) |
| *G01S 19/19* | (2010.01) |
| *H04W 12/06* | (2021.01) |

(52) U.S. Cl.
CPC ........... *G06Q 50/01* (2013.01); *G06T 19/006* (2013.01); *H04L 51/32* (2013.01); *H04L 67/18* (2013.01); *H04W 4/029* (2018.02); *H04W 4/21* (2018.02); *H04W 4/80* (2018.02); *H04W 12/06* (2013.01); *G01S 19/19* (2013.01)

(56) References Cited

U.S. PATENT DOCUMENTS

| | | |
|---|---|---|
| 5,913,918 A | 6/1999 | Nakano et al. |
| 6,115,177 A | 9/2000 | Vossler |
| 6,166,679 A | 12/2000 | Lemelson et al. |
| 6,195,090 B1 | 2/2001 | Riggins, III |
| 6,199,015 B1 | 3/2001 | Curtwright et al. |
| 6,304,211 B1 | 10/2001 | Boman |
| 6,317,127 B1 | 11/2001 | Daily et al. |
| 6,330,356 B1 | 12/2001 | Sundareswaran et al. |
| 6,409,607 B1 | 6/2002 | Libit et al. |
| 6,411,266 B1 | 6/2002 | Maguire, Jr. |
| 6,452,544 B1 | 9/2002 | Hakala et al. |
| 6,559,884 B1 | 5/2003 | Tamir et al. |
| 6,578,203 B1 | 6/2003 | Anderson, Jr. et al. |
| 6,618,593 B1 | 9/2003 | Drutman |
| 6,671,390 B1 | 12/2003 | Barbour et al. |
| 6,721,542 B1 | 4/2004 | Anttila et al. |
| 6,744,403 B2 | 6/2004 | Milnes et al. |
| 6,801,516 B1 | 10/2004 | Lomp et al. |
| 6,868,338 B1* | 3/2005 | Elliott ................ A63B 24/0021 340/990 |
| 6,879,443 B2 | 4/2005 | Spitzer et al. |
| 6,885,652 B1 | 4/2005 | Ozukturk et al. |
| 6,894,994 B1 | 5/2005 | Grob et al. |
| 6,909,738 B2 | 6/2005 | Akopian et al. |
| 6,917,644 B2 | 7/2005 | Cahn et al. |
| 6,920,328 B2 | 7/2005 | Wollrab |
| 6,996,402 B2 | 2/2006 | Logan et al. |
| 7,002,551 B2 | 2/2006 | Azuma et al. |
| 7,031,728 B2 | 4/2006 | Beyer, Jr. |
| 7,053,780 B1 | 5/2006 | Straub et al. |
| 7,123,215 B2 | 10/2006 | Nakada |
| 7,209,035 B2 | 4/2007 | Tabankin et al. |
| 7,317,705 B2 | 1/2008 | Hanson |
| 7,353,034 B2 | 4/2008 | Haney |
| 7,441,198 B2 | 10/2008 | Dempski et al. |
| 7,518,501 B2 | 4/2009 | Huston |
| 7,546,317 B1 | 6/2009 | Kaptelinin |
| 7,593,687 B2 | 9/2009 | Anderson, Jr. et al. |
| 7,716,283 B2 | 5/2010 | Thukral |
| 7,812,766 B2 | 10/2010 | Leblanc et al. |
| 7,855,638 B2 | 12/2010 | Huston |
| 8,172,702 B2 | 5/2012 | Meadows et al. |
| 8,275,397 B2 | 9/2012 | Huston |
| 9,597,576 B2 | 3/2017 | Peterson et al. |
| 2002/0038178 A1 | 3/2002 | Talkenberg et al. |
| 2002/0094853 A1 | 7/2002 | Hayashi |
| 2002/0154174 A1 | 10/2002 | Redlich et al. |
| 2002/0188678 A1 | 12/2002 | Edecker et al. |
| 2002/0196280 A1 | 12/2002 | Bassett et al. |
| 2003/0032436 A1 | 2/2003 | Mikuni |
| 2003/0038892 A1 | 2/2003 | Wang et al. |
| 2003/0109322 A1 | 6/2003 | Funk et al. |
| 2003/0149496 A1 | 8/2003 | Johnson |
| 2003/0156134 A1 | 8/2003 | Kim |
| 2003/0174178 A1 | 9/2003 | Hodges |
| 2003/0187730 A1 | 10/2003 | Natarajan et al. |
| 2003/0189589 A1 | 10/2003 | LeBlanc et al. |
| 2003/0194685 A1 | 10/2003 | Adams |
| 2003/0210228 A1* | 11/2003 | Ebersole ................ G06F 3/147 345/157 |
| 2004/0036622 A1 | 2/2004 | Dukach et al. |
| 2004/0051680 A1 | 3/2004 | Azuma et al. |
| 2004/0104935 A1 | 6/2004 | Williamson et al. |
| 2004/0147329 A1* | 7/2004 | Meadows ............... A63B 57/00 473/131 |
| 2004/0152058 A1* | 8/2004 | Browne ............. A63B 69/3608 434/258 |
| 2004/0161246 A1 | 8/2004 | Matsushita et al. |
| 2005/0227791 A1 | 3/2005 | McCreary et al. |
| 2005/0078195 A1 | 4/2005 | VanWagner |
| 2005/0107952 A1* | 5/2005 | Hoshino ................. G01C 21/36 701/431 |
| 2005/0143096 A1 | 6/2005 | Boesch |
| 2005/0148388 A1 | 7/2005 | Vayra et al. |
| 2005/0207617 A1 | 9/2005 | Sarnoff |
| 2005/0250458 A1 | 11/2005 | Graham et al. |
| 2005/0259002 A1 | 11/2005 | Erario et al. |
| 2006/0015923 A1 | 1/2006 | Chuah |
| 2006/0075445 A1 | 4/2006 | O'Kane |
| 2006/0104600 A1 | 5/2006 | Abrams |
| 2006/0105857 A1 | 5/2006 | Stark |
| 2006/0136173 A1 | 6/2006 | Case et al. |
| 2006/0195361 A1 | 8/2006 | Rosenberg |
| 2006/0262140 A1 | 11/2006 | Kujawa et al. |
| 2006/0284791 A1 | 12/2006 | Chen et al. |
| 2007/0024527 A1 | 2/2007 | Heikkinen et al. |
| 2007/0060408 A1 | 3/2007 | Schultz et al. |
| 2007/0103292 A1 | 5/2007 | Burkley et al. |
| 2007/0150444 A1 | 6/2007 | Chesnais et al. |
| 2007/0174183 A1 | 7/2007 | Jung et al. |
| 2007/0179792 A1 | 8/2007 | Kramer |
| 2007/0191020 A1 | 8/2007 | Fischer et al. |
| 2007/0242131 A1* | 10/2007 | Sanz-Pastor ............ H04L 51/20 348/14.02 |
| 2007/0255831 A1 | 11/2007 | Hayashi et al. |
| 2007/0265089 A1 | 11/2007 | Robarts et al. |
| 2007/0282688 A1 | 12/2007 | Buhrow et al. |
| 2008/0163379 A1 | 7/2008 | Robinson |
| 2008/0194323 A1 | 8/2008 | Merkli et al. |
| 2008/0293443 A1 | 11/2008 | Pettinato |
| 2009/0054084 A1 | 2/2009 | Buhrke et al. |
| 2009/0089162 A1 | 4/2009 | Davis et al. |
| 2009/0091583 A1* | 4/2009 | McCoy ................... A63F 13/02 345/633 |

(56) References Cited

U.S. PATENT DOCUMENTS

| | | | |
|---|---|---|---|
| 2009/0094106 | A1 | 4/2009 | Porter et al. |
| 2009/0102859 | A1 | 4/2009 | Athsani et al. |
| 2009/0147070 | A1 | 6/2009 | Marathe et al. |
| 2009/0300520 | A1 | 12/2009 | Ashutosh et al. |
| 2010/0081520 | A1 | 4/2010 | Peterson et al. |
| 2011/0154223 | A1 | 6/2011 | Whitnah et al. |
| 2011/0157180 | A1 | 6/2011 | Burger et al. |
| 2011/0191141 | A1 | 8/2011 | Thompson et al. |
| 2011/0230986 | A1 | 9/2011 | Lafortune et al. |
| 2011/0288914 | A1 | 11/2011 | Guthrie |
| 2011/0305369 | A1 | 12/2011 | Bentley et al. |
| 2012/0111688 | A1 | 5/2012 | Komai et al. |
| 2012/0146907 | A1 | 6/2012 | Viju |
| 2013/0182914 | A1 | 7/2013 | Sakai et al. |
| 2013/0182930 | A1 | 7/2013 | Trzasko et al. |
| 2013/0188030 | A1 | 7/2013 | Igarashi |
| 2014/0037642 | A1 | 2/2014 | McCafferty et al. |

FOREIGN PATENT DOCUMENTS

| | | |
|---|---|---|
| EP | 1262213 | 12/2002 |
| JP | 10-154242 | 6/1998 |
| KR | 10-2004-0047692 | 6/2004 |
| KR | 10-2005-0055506 | 6/2005 |
| WO | 01/05476 | 1/2001 |
| WO | 01/36061 | 5/2001 |

OTHER PUBLICATIONS

F. Sparacino, G. Davenport and A. Pentland, "Media in performance: Interactive spaces for dance, theater, circus, and museum exhibits," in IBM Systems Journal, vol. 39, No. 3.4, pp. 479-510, 2000, doi: 10.1147/sj.393.0479. (Year: 2000).*
J. R. Parker and C. Martini, "Puppetry of the pixel: Producing live theatre in virtual spaces," 2011 IEEE Consumer Communications and Networking Conference (CCNC), Las Vegas, NV, USA, 2011, pp. 327-331, doi: 10.1109/CCNC.2011.5766483. (Year: 2011).*
Barstow et al., "Personalized Interactive Real-Time Sports Reporting Using Java," American Programmer, Jan. 1997, pp. 32-37.
Final Office Action dated Apr. 8, 2013 for U.S. Appl. No. 13/182,930.
Final Office Action dated Dec. 28, 2009 for U.S. Appl. No. 11/456,715.
Final Office Action dated Feb. 6, 2013 for U.S. Appl. No. 13/423,423.
Final Office Action dated Jul. 24, 2012 for U.S. Appl. No. 12/111,688.
Final Office Action dated Jun. 13, 2011 for U.S. Appl. No. 12/146,907.
Final Office Action dated Jun. 22, 2010 for U.S. Appl. No. 11/875,414.
Final Office Action dated Jun. 30, 2014 for U.S. Appl. No. 13/182,930.
Final Office Action dated Jun. 9, 2011 for U.S. Appl. No. 11/875,414.
Final Office Action dated Nov. 23, 2016 for U.S. Appl. No. 14/247,694.
Final Office Action dated Nov. 7, 2011 for U.S. Appl. No. 11/624,998.
Final Office Action dated Oct. 1, 2008 for U.S. Appl. No. 11/456,723.
Final Office Action dated Oct. 28, 2014 for U.S. Appl. No. 13/182,914.
Final Office Action dated Sep. 9, 2015 for U.S. Appl. No. 12/111,688.
Final Office Action dated Sep. 9, 2015 for U.S. Appl. No. 13/182,914.
Final Office Action dated Sep. 30, 2013 for U.S. Appl. No. 13/182,914.
International Search Report, PCT/US2006/027218, dated Feb. 12, 2007.
Notice of Allowance dated Aug. 30, 2016 for U.S. Appl. No. 14/037,642.
Notice of Allowance dated Aug. 6, 2013 for U.S. Appl. No. 13/605,174.
Notice of Allowance dated Dec. 14, 2016 for U.S. Appl. No. 14/486,480.
Notice of Allowance dated Mar. 9, 2012 for U.S. Appl. No. 12/146,907.
Notice of Allowance dated May 8, 2014 for U.S. Appl. No. 13/423,423.
Notice of Allowance dated Oct. 4, 2010 for U.S. Appl. No. 11/456,715.
Notice of Allowance dated Sep. 18, 2017 for U.S. Appl. No. 14/247,694.
Office Action dated Apr. 14, 2009 for U.S. Appl. No. 11/456,715.
Office Action dated Apr. 14, 2010 for U.S. Appl. No. 11/624,998.
Office Action dated Apr. 17, 2008 for U.S. Appl. No. 11/456,723.
Office Action dated Aug. 7, 2015 for U.S. Appl. No. 14/037,642.
Office Action dated Aug. 2, 2013 for U.S. Appl. No. 12/111,688.
Office Action dated Aug. 20, 2013 for U.S. Appl. No. 13/423,423.
Office Action dated Aug. 29, 2012 for U.S. Appl. No. 13/188,030.
Office Action dated Aug. 8, 2011 for U.S. Appl. No. 12/111,688.
Office Action dated Dec. 16, 2014 for U.S. Appl. No. 12/111,688.
Office Action dated Dec. 21, 2010 for U.S. Appl. No. 11/875,414.
Office Action dated Feb. 12, 2013 for EP Patent Application No. 06787161.6.
Office Action dated Feb. 15, 2011 for U.S. Appl. No. 11/624,998.
Office Action dated Feb. 23, 2017 for U.S. Appl. No. 14/247,694.
Office Action dated Jan. 22, 2015 for U.S. Appl. No. 13/182,914.
Office Action dated Jan. 3, 2012 for U.S. Appl. No. 13/188,030.
Office Action dated Jan. 4, 2012 for U.S. Appl. No. 12/146,907.
Office Action dated Jul. 12, 2017 for U.S. Appl. No. 15/097,711.
Office Action dated Jun. 14, 2011 for U.S. Appl. No. 11/624,998.
Office Action dated Mar. 16, 2010 for U.S. Appl. No. 11/456,715.
Office Action dated Mar. 19, 2014 for U.S. Appl. No. 13/182,914.
Office Action dated Mar. 27, 2012 for U.S. Appl. No. 11/875,414.
Office Action dated Mar. 4, 2011 for U.S. Appl. No. 12/146,907.
Office Action dated Mar. 7, 2013 for U.S. Appl. No. 13/182,914.
Office Action dated May 26, 2016 for U.S. Appl. No. 14/247,694.
Office Action dated Nov. 22, 2012 for KR Patent Application No. 10-2008-7003027.
Office Action dated Oct. 6, 2009 for U.S. Appl. No. 11/624,998.
U.S. Patent and Trademark Office, Office Action for U.S. Appl. No. 11/875,414 dated Oct. 6, 2009, 12 pages.
U.S. Patent and Trademark Office, Office Action for U.S. Appl. No. 14/486,480 dated Sep. 24, 2015, 28 pages.
U.S. Patent and Trademark Office, Office Action for U.S. Appl. No. 11/624,998 dated Sep. 1, 2010, 16 pages.
U.S. Patent and Trademark Office, Office Action for U.S. Appl. No. 13/182,930 dated Sep. 10, 2012, 18 pages.
U.S. Patent and Trademark Office, Office Action for U.S. Appl. No. 13/182,930 dated Sep. 25, 2013, 22 pages.
O'Malley et al., "Human Activity Tracking for Wide-Area Surveillance," University of Florida, Department of Electrical and Computer Engineering, May 2002, 7 pages.
Chung et al., "My Second Bike: A TV-enables social and interactive riding experience," IEEE CCNC 2010, Feb. 2010, 5 pages.
Bolter et al., "Is It Live or Is It AR?", IEEE Spectrum, Jul. 31, 2007, 5 pages.
Falchuk, "Visual and Interaction Design Themes in Mobile Healthcare", 2009 6th Annual International Mobile and Ubiquitous Systems: Networking & Services, Jul. 2009, 10 pages.
Cheok et al., "Capture the Flag: Mixed-Reality Social Gaming with Smart Phones," IEEE Pervasice Computing, vol. 5, No. 2, Apr. 2006, 8 pages.

* cited by examiner

SYSTEM AND METHOD FOR CREATING CONTENT FOR AN EVENT USING A SOCIAL NETWORK

CONTINUING DATA

This application is a continuation of U.S. patent application Ser. No. 15/097,711, filed Apr. 13, 2016, which is a continuation of U.S. patent application Ser. No. 14/037,642 (now U.S. Pat. No. 9,498,694) filed Sep. 26, 2013, which is a continuation of U.S. patent application Ser. No. 13/605,174 (now U.S. Pat. No. 8,589,488) filed Sep. 6, 2012 which is a continuation of U.S. patent application Ser. No. 13/182,930 (now U.S. Pat. No. 8,933,967) filed Jul. 14, 2011 and Ser. No. 13/152,476 filed Jun. 3, 2011. Application '930 is a continuation-in-part of U.S. patent application Ser. No. 12/111,688 (now U.S. Pat. No. 9,445,225) filed Apr. 29, 2008 which is a continuation-in-part of U.S. patent application Ser. No. 11/875,414 (now U.S. Pat. No. 8,249,626) filed Oct. 19, 2007 which is a continuation-in-part of U.S. patent application Ser. No. 11/624,998 (now U.S. Pat. No. 8,275,397) filed Jan. 19, 2007 which is a continuation-in-part of U.S. patent application Ser. No. 11/456,715 (now U.S. Pat. No. 7,855,638) and Ser. No. 11/456,723 (now U.S. Pat. No. 7,518,501) filed Jul. 11, 2006 both of which claim priority to U.S. Provisional Application No. 60/699,205 filed Jul. 14, 2005 (sometimes referred to collectively as "related applications" herein).

BACKGROUND

1. Field of the Invention

This invention relates to a system and methods for creating and sharing an event using a social network. In particular, the system and methods hereof uses artificial reality to provide visual information to a user of the social network.

2. Description of the Related Art

U.S. Pat. Nos. 7,855,638; 8,275,397; 8,249,626; 8,207,843, and U.S. Publication No. 2008/0198230 (all incorporated herein by reference) relate generally to viewing people, places, and events, such as sporting events, using positioning and artificial reality to improve the event viewing experience. While a plan view of a map is useful for event planning, such views can be confusing and typically have limited functions to interact with the event.

Commercial applications of augmented reality exist such as Layar, Wikitude, Junaio, Sekai Camera and others which use augmented reality to aid finding information about points of interest. See, e.g., www.layar.com, www.wikitude.org/en/, and www.junaio.com.

Products or services that are tailored to the user are prevalent, such as advertising models from Google based on search terms or advertising based on personal information of a user. For example, Apple postulates displaying advertising to a mobile customer using one of its devices based on marketing factors. To compute marketing factors the Apple system captures not only the machine identity, but search history, personal demographics, time of day, location, weather, loyalty program membership, media library, user opinion or opinions of friends and family, etc. (collectively, referred to as "marketing factors"). See, e.g., U.S. Publication Nos. 2010/0125492; 2009/0175499; 2009/0017787; 2009/0003662; 2009/0300122, and U.S. Pat. No. 7,933,900 (all incorporated herein by reference). Links to and use of social media, such as Facebook and Twitter, sometimes paired with location, are also possible indicators of a user behavior and user demographics. See e.g., U.S. Publication Nos. 2009/0003662; 2011/0090252, and U.S. Pat. Nos. 7,188,153; 7,117,254; 7,069,308 (all incorporated herein by reference).

Social networks are well known, and examples include LinkedIn.com, Google+ or Facebook.com and various social utilities to support social networking. Growing a social network can mean that a person needs to discover like-minded or compatible people who have similar interests or experiences to him or her. Identifying like-minded people, however, often requires a substantial amount of and time and effort because identifying new persons with common interests for friendships is difficult. For example, when two strangers meet, it may take a long and awkward conversation to discover their common interests or experiences.

Social networks, in general, track and enable connections between members (including people, businesses, and other entities). In particular, social networking websites allow members to communicate more efficiently information that is relevant to their friends or other connections in the social network. Social networks typically incorporate a system for maintaining connections among members in the social network and links to content that is likely to be relevant to the members. Social networks also collect and maintain information about the members of the social network. This information may be static, such as geographic location, employer, job type, age, music preferences, interests, and a variety of other attributes, or it may be dynamic, such as tracking a member's actions within the social network.

A typical modern computer-implemented social networking application requires each user to provide some biographical information, and/or identify his or her interests, and in some instances can suggest to the user other users with compatible interests. For example, some web sites such as LinkedIn.com or Facebook.com require participants to register as members. Each member can fill out a profile or provide other personal data such as professional interests, career information, interests in music, books, movies, and even information about political or religious beliefs. Matching algorithms can then use the profile or data provided to match members with members who are deemed compatible by the algorithms, under the assumption, for example, that matching people's interests and values can lead to successful new friendships or relationships within the social network. Some mobile device-based applications for identifying common interests require each user to configure the user's mobile device, including entering the user's interest, such as the things the user wishes to buy or sell, the kind of people the user wishes to meet, etc., before a social networking opportunity can be found for the user.

Typically, when a user who is also a member of a social network wishes to share information with other members of the social network, the user generally uploads or copies and pastes the information to a location on the social network or forwards the information in the form of a message or email to other members. Often, certain forms of information do not copy and paste very well from one medium to another, so additional formatting or modifications to the information may be required before it is suitable for viewing by other members. Therefore, the quality and type of shared information is limited and members may be less likely to share information with each other.

Various attempts have been made at sharing sports related event information. For example, select information can be shared or published with groups as more fully described in U.S. Pat. No. 7,478,078 and U.S. Publication Nos. 2008/0036653; 2011/0142016; 2010/0070758; 2011/0098928; and 2009/0144392. Related applications, including U.S. Pat. No. 8,249,626 and U.S. Publication No. 2007/0117576 describe how locations, interest, social information, are created and published to groups or within defined groups. Groups can be formed based on certain criteria. Groups can be formed ahead of time or be dynamic. Social networking participants can view shared views and AR messages.

SUMMARY OF THE INVENTION

Generally speaking, the system and methods of the present invention enhance and expand the participant and spectator experience at an event by sharing the event on a social network. The event includes views of the event from a participant position and AR messages overlaid the view. The participant(s) and spectators can communicate with each other, providing a mechanism for a remote "gallery" of spectators.

In one form, a method of sharing an event with members of a social network is provided and includes announcing to one or more members of a social network an invitation to participate in said event and operating a device accompanying said participant during the event to track positions of the participant during the event. The positions are communicated to a social media server associated with the social network. Some of the invited members subscribe to the event on the social network where they can view the event with a perspective view from a participant position recorded on said social media server. The view includes an augmented reality (AR) message and preferably a photo background or artificial reality background.

In one embodiment, a system of sharing an event with members of a social network is provided and includes a device accompanying said participant during the event and a server associated with said social network.

The system includes a communication link between the participant in the event and a social network to announce to members of the social network an opportunity to participate in said event. The device accompanies the participant during the event to track positions of said participant during the event and a communication link between the device and the server to communicate the positions to the social network server. The server operates to permit said members to become spectators to the event on the social network and view the event where at least one view is a perspective view from a participant position recorded on the server and includes an augmented reality (AR) message.

In one form, a method of compensating a participant in an event, is provided and includes tracking the positions of the participant at the event as the participant traverses the venue of the event. The positions of the participant are communicated to members of a social network who have elected to become spectators of the event. The event is viewed by the spectators in real time where at least some of the views are a perspective view of the venue from a participant position and includes an AR message. The method includes a mechanism for compensating the participant by the spectators (or other participants) by rewarding compensation to the participant based on a participant activity during the event, such as for golf, a birdie or a bet or a good round. Other sports have other goal oriented activities, such as winning a stage in a bike race or fastest heat time in a ski slalom course. The compensation can be in a variety of forms, including virtual goods, virtual services, awards, trophies, money, credits or donations to a charity. For example, in a professional or charity event spectators can donate money to a designated charity based on outcomes or activities in the event.

DETAILED DESCRIPTION

Figure 1:
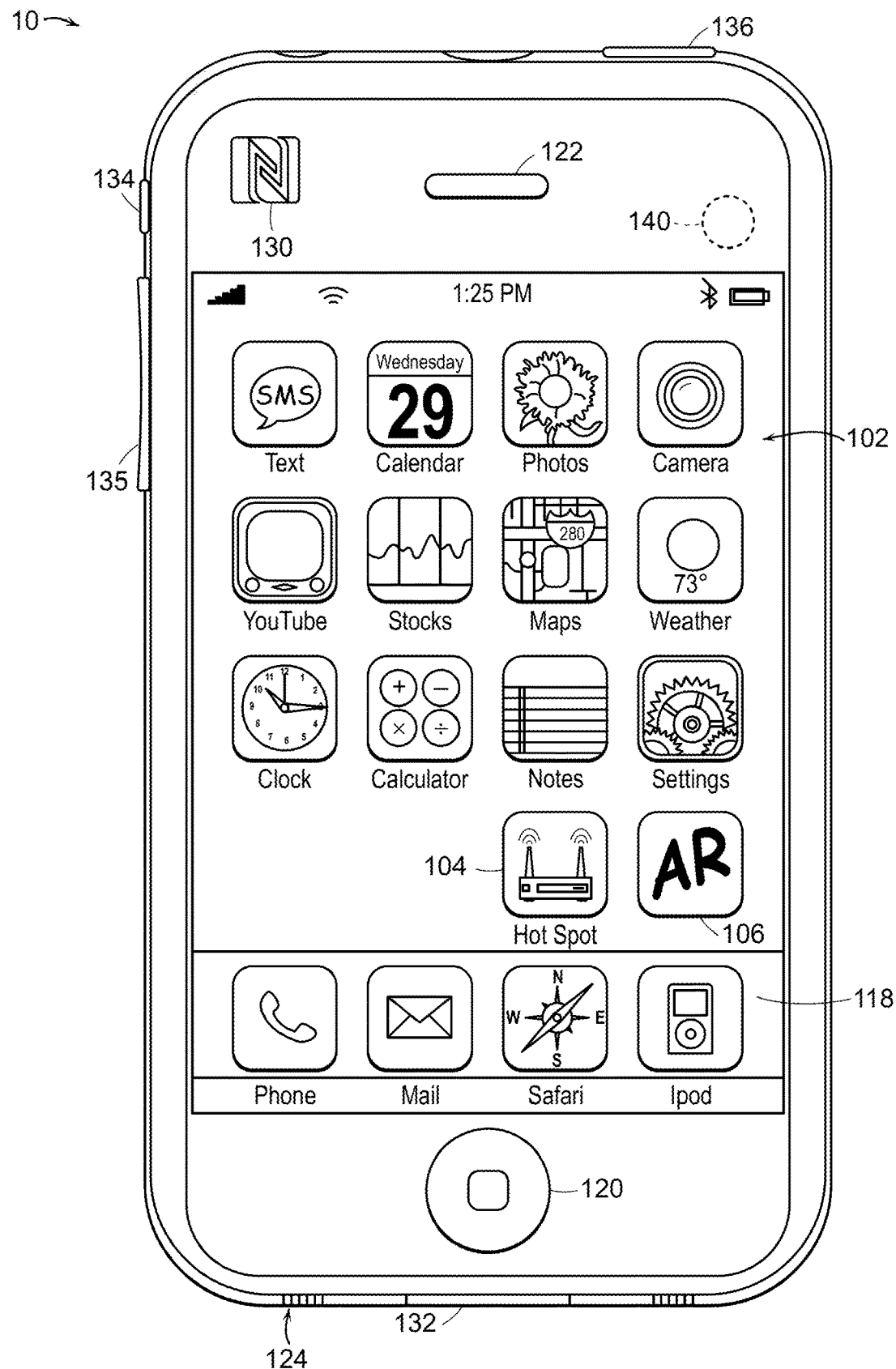
FIG. 1 is a front elevation view of a smart phone having a graphics display.

High bandwidth, wireless networks are becoming commonplace, as is the computing power of mobile devices. Further rendering engines are becoming readily available for wide ranging applications of artificial reality. Viewing an event, such as a sporting event, using a mobile device adds greatly to the user experience. Many sporting events, such as golf, can be enhanced using a mobile device and artificial reality. U.S. Pat. No. 7,855,638 describes several examples of a system and method for viewing such events. In such event viewing systems, the background can be a real world image (e.g. photograph) or a virtual world rendering, but in a preferred case, artificial reality is used to enhance the perspective viewing experience.

In creating such environments for the venue of the event, such as a golf course, bike race, ski competition, or the like, it is desirable to insert virtual objects into the environment, such as messages, tips, targets, critiques, warnings, etc. The virtual objects overlay a background environment, preferably as viewed from a user selected position. Typically, the user selected position is a participant present position as determined by GPS. Thus, in a preferred embodiment the sport participant (golfer, skier, biker, etc.) is presented with a perspective view of the event from the participant's current position (i.e. "viewpoint") with virtual objects visually presented to the participant.

The present system and methods also address many sport related functions that can be used in such an artificial reality or mixed reality environment. For example, a basic function in golf is displaying in perspective view the golf hole from the golfer's location and identifying distances to hazards or the green. However, other functions exist, such as displaying suggested playing strategy based on the golfer's personal data or profile, a similar handicap golfer, or as suggested by tips from a pro. Further, games can be incorporated into the system and method such as corporate outing type experiences—closest to the pin, longest drive, accurate drive, as measured from an artificial reality target, etc. Other functions such as contests and betting can also be incorporated.

In the present application, the term "message" is used to encompass any artificial reality or virtual object, such as distance messages, advertisements, other facts, targets, shot distribution diagrams, event information, warnings, announcements and other types of alpha numeric displays. However, the message could also be a graphic, logo or brand. It shall be understood that other objects or graphics may also be enhanced and the term "message" is understood to include other objects.

In the present application, the term "social network" is used to refer to any process or system that tracks and enables connections between members (including people, businesses, and other entities) or subsets of members. The connections and membership may be static or dynamic and the membership can include various subsets within a social network. For example, a person's social network might include a subset of members interested in golf and the person shares a golf outing only with the golf interest subset. Further, a social network might be dynamically configured. For example, a social network could be formed for "Pebble Beach" for August 3 and anyone interested could join the Pebble Beach August 3 social network. Alternatively, anyone within a certain range of the event might be permitted to join. The permutations involving membership in a social network are many and not intended to be limiting.

A social network that tracks and enables the interactive web by engaging users to participate in, comment on and create content as a means of communicating with their social graph, other users and the public. In the context of the present invention, such sharing and social network participation includes participant created content and spectator created content and of course, jointly created content. For example, the created content can be interactive to allow spectators to add content to the participant created event.

Examples of conventional social networks include LinkedIn.com or Facebook.com, Google Plus, Twitter (including Tweetdeck), social browsers such as Rockmelt, and various social utilities to support social interactions including integrations with HTML5 browsers. www.Wikipedia.org/wiki/list_of_social_networking_sites lists several hundred social networks in current use. Dating sites, Listservs, and Interest groups can also server as a social network. Interest groups or subsets of a social network are particularly useful for inviting members to attend an event, such as Google+ "circles" or Facebook "groups." Individuals can build private social networks. Conventional social networking websites allow members to communicate more efficiently information that is relevant to their friends or other connections in the social network. Social networks typically incorporate a system for maintaining connections among members in the social network and links to content that is likely to be relevant to the members. Social networks also collect and maintain information about the members of the social network. This information may be static, such as geographic location, employer, job type, age, music preferences, interests, and a variety of other attributes, or it may be dynamic, such as tracking a member's actions within the social network. The methods and system hereof relate to dynamic events of a member's actions shared within a social network.

The most common positioning technology is GPS. As used herein, GPS—sometimes known as GNSS—is meant to include all of the current and future positioning systems that include satellites, such as the U.S. Navistar, GLONASS, Galileo, EGNOS, WAAS, MSAS, QZSS, etc. The accuracy of the positions, particularly of the participants, can be improved using known techniques, often called differential techniques, such as WAAS (wide area), LAAS (local area), Carrier-Phase Enhancement (CPGPS), Space Based Augmentation Systems (SBAS); Wide Area GPS Enhancement (WAGE), or Relative Kinematic Positioning (RKP). Even without differential correction, numerous improvements are increasing GPS accuracy, such as the increase in the satellite constellation, multiple frequencies ($L_1$, $L_2$, $L_5$), modeling and AGPS improvements, software receivers, and ground station improvements. Of course, the positional degree of accuracy is driven by the requirements of the application. In the golf example used to illustrate a preferred embodiment, sub five meter accuracy provided by WAAS with Assisted GPS would normally be acceptable. Further, some "events" might be held indoors and the same message enhancement techniques described herein used. Such indoor positioning systems include IMEO, Wi-Fi (Skyhook), Cell ID, pseudolites, repeaters, RSS on any electromagnetic signal (e.g. TV) and others known or developed.

The term "geo-referenced" means a message fixed to a particular location or object. Thus, the message might be fixed to a venue location, e.g., golf course fence or fixed to a moving participant, e.g., a moving golf car or player. An object is typically geo-referenced using either a positioning technology, such as GPS, but can also be geo-referenced using machine vision. If machine vision is used (i.e. object recognition), applications can be "markerless" or use "markers," sometimes known as "fiducials." Marker-based augmented reality often uses a square marker with a high contrast. In this case, four corner points of a square are detected by machine vision using the square marker and three-dimensional camera information is computed using this information. Other detectable sources have also been used, such as embedded LED's or special coatings or QR codes. Applying AR to a marker which is easily detected is advantageous in that recognition and tracking are relatively accurate, even if performed in real time. So, in applications where precise registration of the AR message in the background environment is important, a marker based system has some advantages.

In a "markerless" system, AR uses a general natural image instead of a fiducial. In general, markerless AR uses a feature point matching method. Feature point matching refers to an operation for searching for and connecting the same feature points in two different images. A method for extracting a plane using a Simultaneous Localization and Map-building (SLAM)/Parallel Tracking and Mapping (PTAM) algorithm for tracking three-dimensional positional information of a camera and three-dimensional positional information of feature points in real time and providing AR using the plane has been suggested. However, since the SLAM/PTAM algorithm acquires the image so as to search for the feature points, computes the three-dimensional position of the camera and the three-dimensional positions of the feature points, and provides AR based on such information, a considerable computation is necessary. A hybrid system can also be used where a readily recognized symbol or brand is geo-referenced and machine vision substitutes the AR message.

In the present application, the venue for the sporting event can be a real view or depicted as a photo background environment or a virtual environment, or a mixture, sometimes referred to as "mixed reality." A convenient way of understanding the messages of the present invention is as a layer of artificial reality or "augmented reality" messages overlaid the sporting event venue background. There are different methods of creating the sporting event venue background as understood by one of ordinary skill in the art. For example, an artificial background environment can be created by a number of rendering engines, sometimes known as a "virtual" environment. See, e.g., Nokia's (through its Navteq subsidiary) Journey View which blends digital images of a real environment with an artificial 3D rendering. A real environment can be the background as seen through glasses of FIG. 9, but can also be created using a digital image. Such a digital image can be stored and retrieved for use, such as a "street view" or photo, video, or panorama, or other type of stored image. Alternatively, many mobile devices have a camera for capturing a digital image which can be used as the background environment. Such a camera-sourced digital image may come from the user, friends, social network groups, crowd-sourced, or service provided. Because the use of a real environment as the background is common, "augmented reality" (AR) often refers to a technology of inserting a virtual reality graphic (object) into an actual digital image and generating an image in which a real object and a virtual object are mixed (i.e. "mixed reality"). AR is characterized in that supplementary information using a virtual graphic may be layered or provided onto an image acquired of the real world. Multiple layers of real and virtual reality can be mixed. In such applications the placement of an object or "registration" with other layers is important. That is, the position of objects or layers relative to each other based on a positioning system should be close enough to support the application. As used herein, "artificial reality" ("AR") is sometimes used interchangeably with "mixed" or "augmented" reality, it being understood that the background environment can be real or virtual.

I. Overview

In the drawings, golf is used as an example of an event where the event can be created and shared on a social network, enhancing and expanding the participant and spectator experience. Turning to the drawings, an illustrative embodiment uses a mobile device, such as smart phone 10 of FIG. 1, accompanying the golfer. The golfer selects AR application 106 on the touch sensitive graphics display 102. Smart phone 10 includes a variety of sensors, including a GPS unit for determining its location, a gyroscope for determining the orientation, an accelerometer, ambient light sensor and a digital compass. Additionally, phone 10 includes one or more radios, such as a packet radio, a cell radio, WiFi, Bluetooth, and near field. Of course, other devices can be used such as the dedicated golf handheld devices as well as a tablet computer having GPS, especially the tablets with screen sizes larger than a smart phone but smaller than about 10 inches to aid portability, such as a Dell Streak, Motorola Xoom, or Samsung Galaxy. In some embodiments, the device can be a tablet affixed to a golf cart with a camera oriented in the direction of travel. That is, in some embodiments, a wireless camera connected to a Bluetooth compatible device 10 may be preferred. Examples of such cameras are JonesCAM LX, Vuzix iWear CamAR available from Vuzix Corporation, Rochester, N.Y., AT-1Wireless available from Dogcam, and ContourGPS available from Contour HD.

Figure 2:
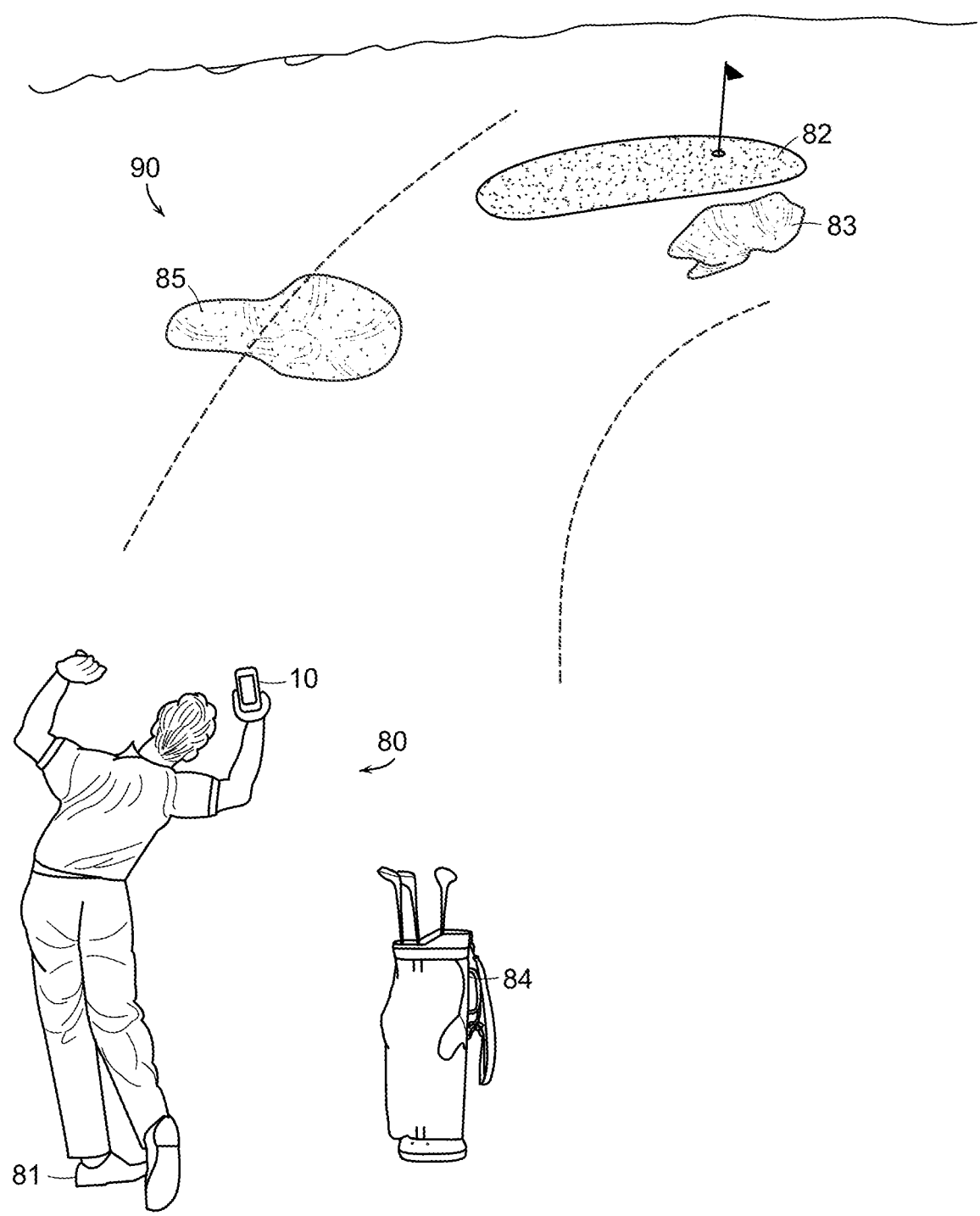
FIG. 2 is a perspective view of a golf hole being played.

FIG. 2 is an illustrative example of golf hole 90 used to describe aspects of the present invention. In this case, player 80 is shooting to green 82 and accompanied by his golf bag 84 while holding device 10 oriented towards green 82. Lake 85 presents a significant hazard to the golfer, as does green side bunker 83. For illustrative purposes, in FIG. 2 the pin on green 82 is 232 yards from the golfer's current location 81, while the near side of lake 85 is 175 yards, and the far side of lake 85 or carry distance on a line between the current location and the pin is 194 yards.

Figure 3:
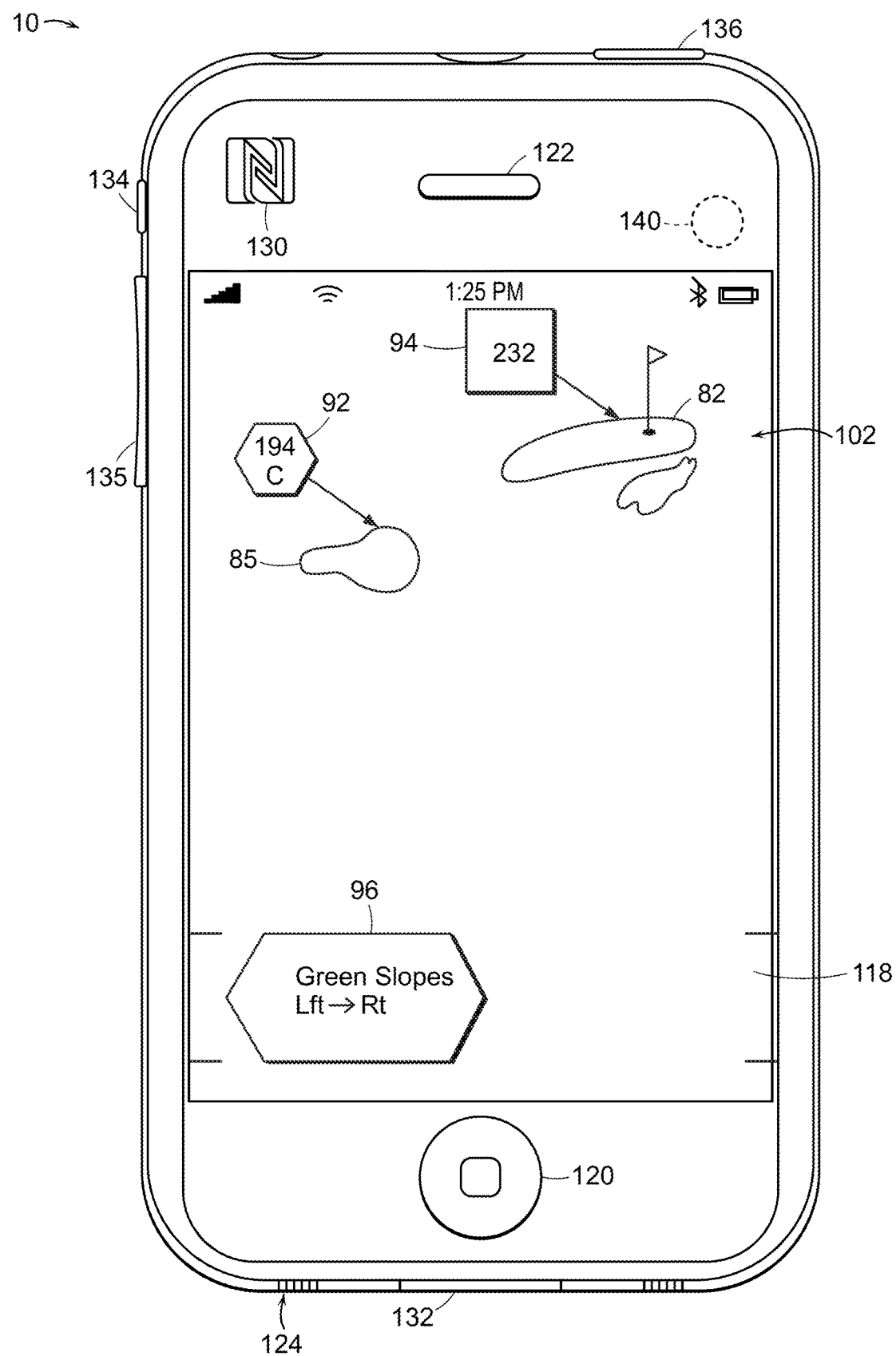
FIG. 3 is a front elevation view of the smart phone of FIG. 1 showing one representation of the golf hole of FIG. 2.

FIG. 3 illustrates the perspective view of golf hole 90 of FIG. 2 as seen on smart phone 10 from the golfer's current location 81. As can be seen, artificial reality message 92 shows that 194 yards is necessary to carry lake 85. Further, AR message 94 shows that the pin is 232 yards from the golfer's current location 81. Further, a pro tip AR message 96 gives the golfer some insight into the green slope. The AR messages can be color coded if desired, e.g., blue for distance and red marking a boundary or hazard.

Figure 9:
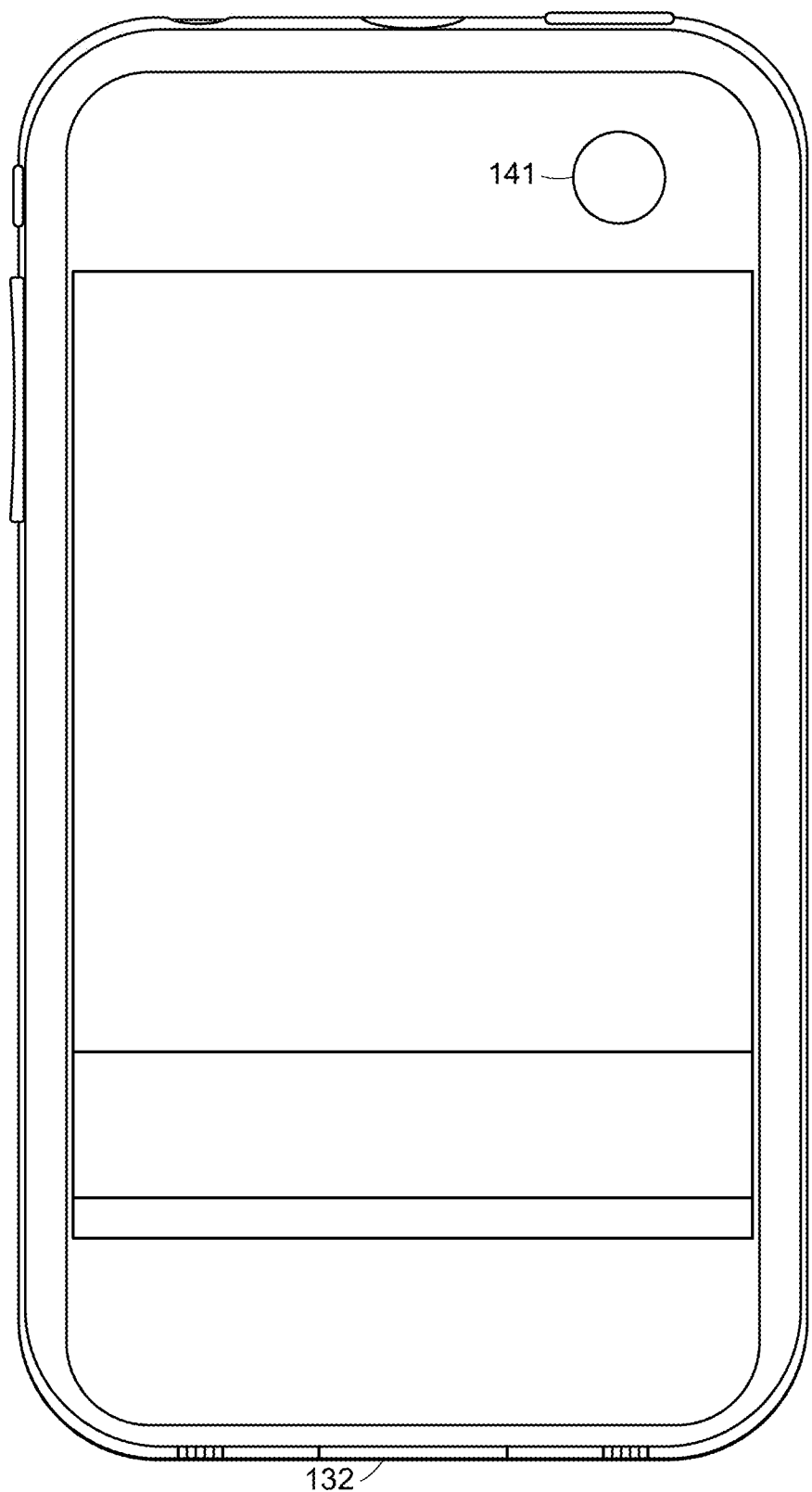
FIG. 9 is a perspective of a portable device where the functionality is built into glasses or goggles worn.

In a preferred embodiment, smart phone 10 is held in the golfer's hand is vertically oriented and positioned in the direction of the desired shot, such as from golfer 80 to green 82 as shown in FIG. 2. The background of the perspective view of golf hole 90 on display 102 is from the GPS determined position of phone 10 using backside camera 141 (FIG. 9). In a preferred embodiment, backside camera 141 is used in phone 10 to provide a photo background from the camera. The AR messages are overlaid the background as seen in FIG. 3. In an alternative embodiment, a virtual background is used and player 80 can more easily select another location, such as behind the golfer or from the green to the golfer for viewing the play of a golf round. The ability to select a starting location or viewpoint is particularly useful when golfer 80 is replaying his round at a later date on a home computing device.

Figure 4:
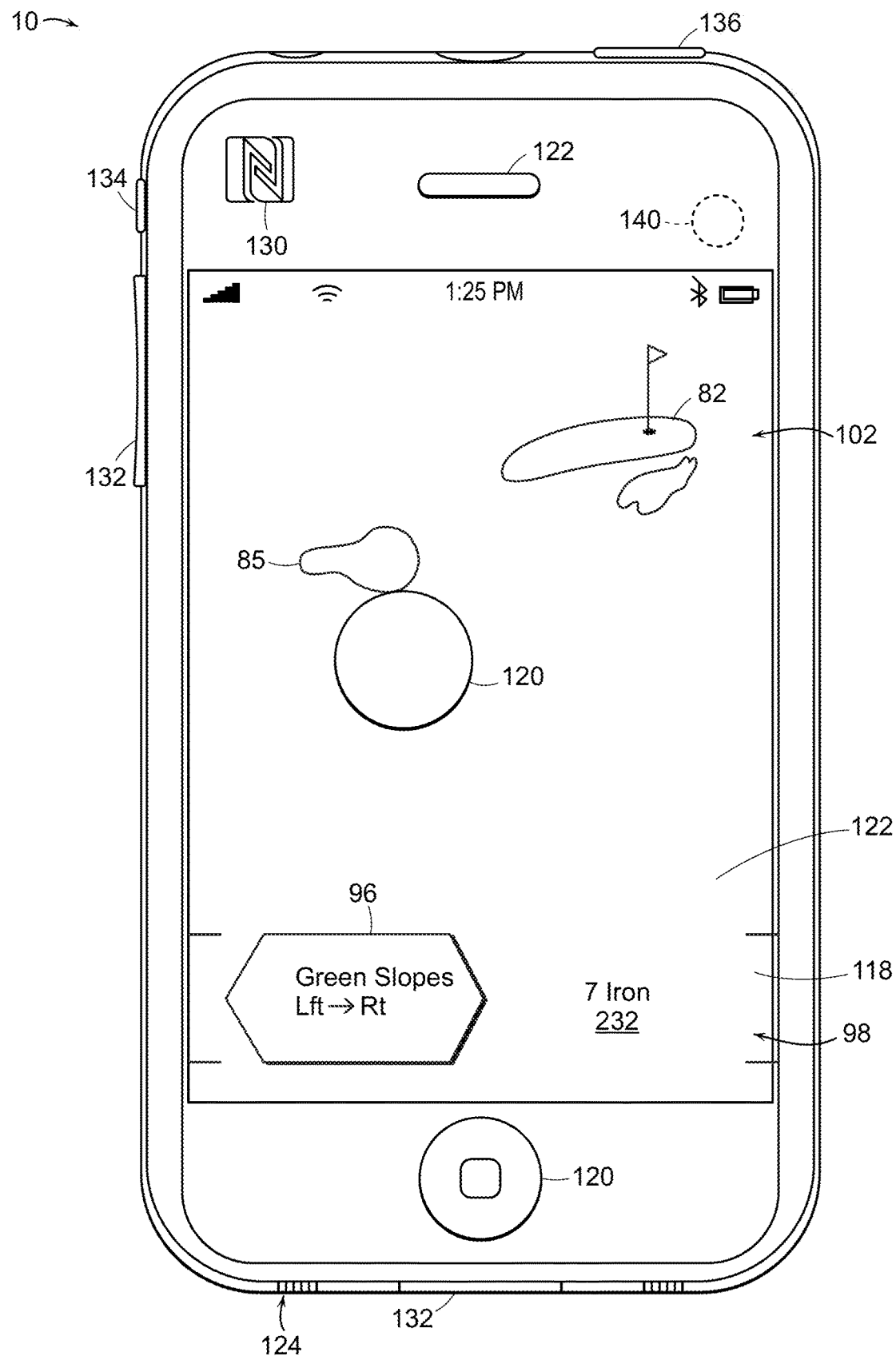
FIG. 4 is a front elevation view of the smart phone of FIG. 1 showing another representation of the golf hole of FIG. 2.

In FIG. 4, AR target area message 120 is illustrated. In this embodiment, golfer 80 is an average handicap golfer whose personal profile shows a shot distribution of a 7 Iron as 145 yards to 165 yards with a 20 yard diameter (i.e. 155 yards with a 20 yard CEP). As discussed below, shot distribution can be highly customized to include actual club use, as adjusted by current winds, density altitude, equipment used, and elevation, or can be a normalized distribution selected by the golfer for a particular skill level. In any event, the device 10 shows target 120 and suggested club for use in window 122. Note that window 98 is used to always show distance to pin (or an approximation such as center of green). In the case illustrated in FIG. 4, the suggestion is to lay up short and to the right of lake 85 using a 7 iron.

Figure 5:
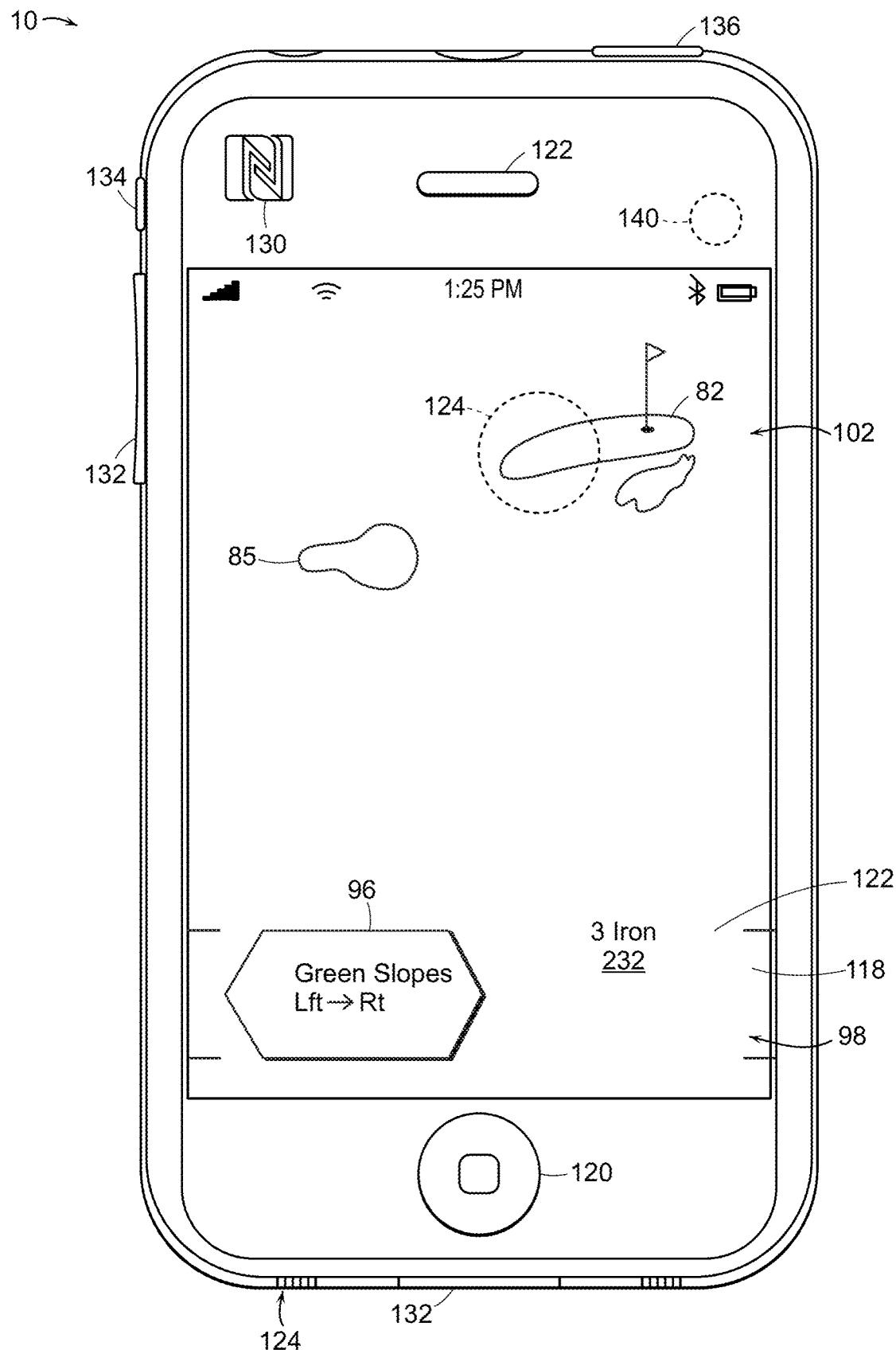
FIG. 5 is a front elevation view of the smart phone of FIG. 1 showing another representation of the golf hole of FIG. 2.

FIG. 5 is similar to FIG. 4, but in this case golfer 80 has an above average personal profile. In this case, the personal profile shows a shot distribution of a 3 Iron as 195 yards to 225 yards with a 30 yard diameter (i.e. 210 yards with a 30 yard CEP). In the case illustrated in FIG. 5, the suggestion is to carry lake 85 aiming for the left side of green 82 aiming for target area 124 using a 3 iron.

Figure 6:
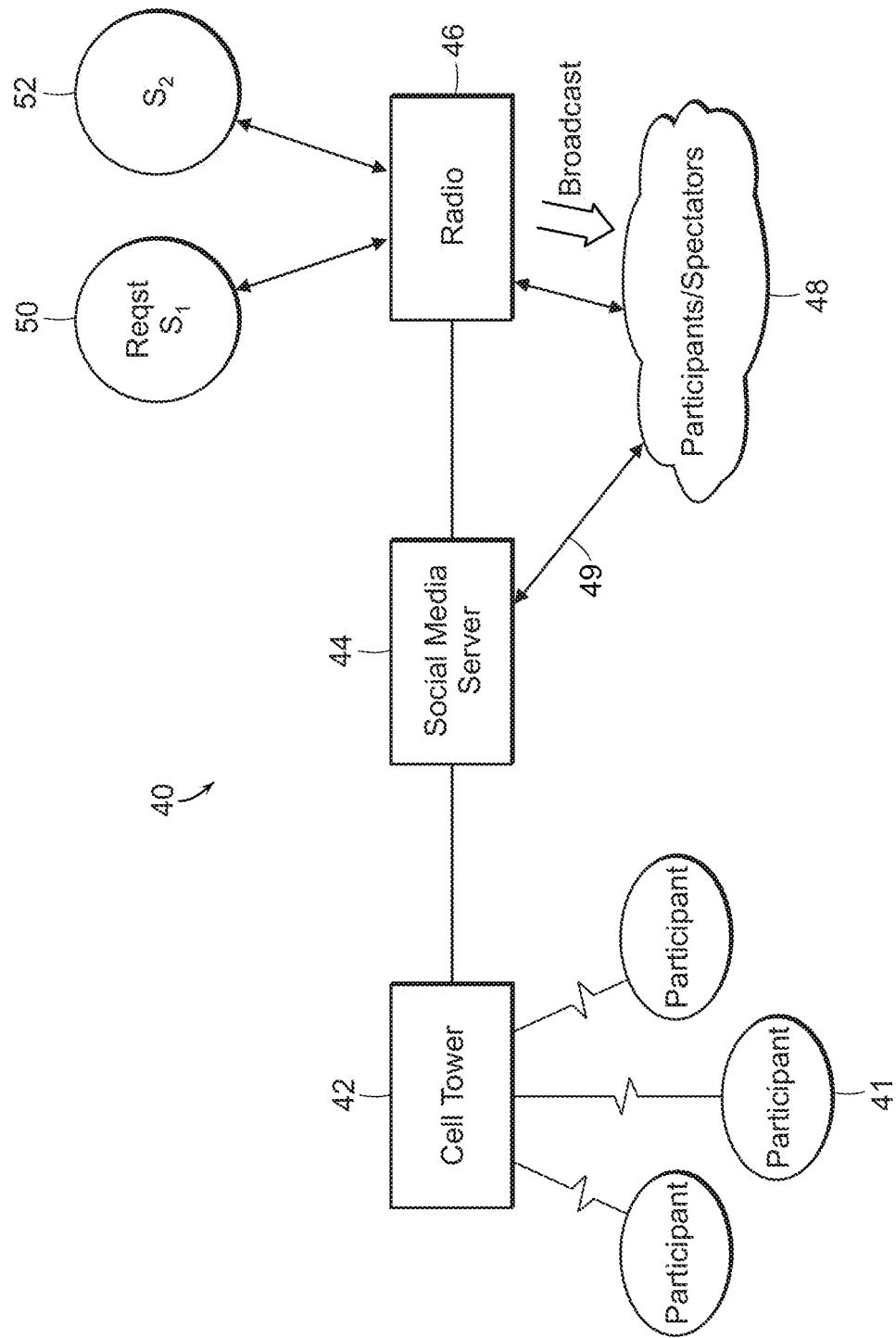
FIG. 6 is a block diagram depicting a wireless, client server architecture in accordance with a preferred embodiment of the present invention.

FIG. 6 illustrates network 40 for the golf course which is useful in some embodiments of the methods and systems of the present invention. A number of participants (golfers) 41 are equipped with a positioning mechanism, such as GPS, with position and other information transmitted by radio to cell tower 42 connected to server 44. Cell tower 42 can be part of a conventional cell network or be an independent picocell or femtocell as is known in the art. The GPS derived position of each participant (golfer) 41 can be corrected and accuracy improved if desired, but is usually less than 5 meters. The participant (golfer) positions, AR messages, and other information is stored by server 44 (e.g. located in the club house) and can be transmitted by radio 46 to any or all other participants or spectators 48 if desired. Groups can be formed or pre-established and information distributed to one or more groups. That is, each participant/spectator 48 has a smart phone 10 for receiving the transmitted participant positions. Of course, server 44 can also transmit golfer position information and communications to a club house, remote, or home spectators via Internet connection 49. Such home or club house spectators can, if desired, call up a screen on their TV or alternatively, watch the golf match on a home computer or other device.

In a preferred form, the participant 41 creates an "event" for a social media which is published to a selected social network. The individuals having access to the event can be selected ad hoc or established prior to the event. The social group having access would typically include other participants, as well as spectators 48. As shown in FIG. 6, the network allows sharing of event information among the selected social group, and includes not only the position of one or more participants at the event venue, but also participant sensor information and play information, and communications among the participants 41 and spectators 48. The sharing of the event can be real time or replayed after the event.

II. Mobile Device

In more detail, FIG. 1 is a front elevational view of a smart phone or mobile device 10, which is the preferred form factor for the device discussed herein to illustrate certain aspects of the present invention. Mobile device 10 can be, for example, a handheld computer, a tablet computer, a personal digital assistant, a cellular telephone, a camera having a GPS and a radio, a GPS with a radio, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing.

Mobile device 10 includes a touch-sensitive graphics display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

The touch-sensitive graphics display 102 can comprise a multi-touch-sensitive display. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. An example of a multi-touch-sensitive display technology is described in U.S. Pat. Nos. 6,323,846; 6,570,557; 6,677,932; and U.S. Publication No. 2002/0015024, each of which is incorporated by reference herein in its entirety. Touch screen 102 and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 102.

Mobile device 10 can display one or more graphical user interfaces on the touch-sensitive display 102 for providing the user access to various system objects and for conveying information to the user. The graphical user interface can include one or more display objects 104, 106. Each of the display objects 104, 106 can be a graphic representation of a system object. Some examples of system objects include device functions, applications, windows, files, alerts, events, or other identifiable system objects.

Mobile device 10 can implement multiple device functionalities, such as a telephony device, as indicated by a phone object; an e-mail device, as indicated by the e-mail object; a network data communication device, as indicated by the Web object; a Wi-Fi base station device (not shown); and a media processing device, as indicated by the media player object. For convenience, the device objects, e.g., the phone object, the e-mail object, the Web object, and the media player object, can be displayed in menu bar 118.

Each of the device functionalities can be accessed from a top-level graphical user interface, such as the graphical user interface illustrated in FIG. 1. Touching one of the objects e.g. 104, 106, etc. can, for example, invoke the corresponding functionality. In the illustrated embodiment, object 106 represents an Artificial Reality application in accordance with the present invention.

Upon invocation of particular device functionality, the graphical user interface of mobile device 10 changes, or is augmented or replaced with another user interface or user interface elements, to facilitate user access to particular functions associated with the corresponding device functionality. For example, in response to a user touching the phone object, the graphical user interface of the touch-sensitive display 102 may present display objects related to various phone functions; likewise, touching of the email object may cause the graphical user interface to present display objects related to various e-mail functions; touching the Web object may cause the graphical user interface to present display objects related to various Web-surfing functions; and touching the media player object may cause the graphical user interface to present display objects related to various media processing functions.

The top-level graphical user interface environment or state of FIG. 1 can be restored by pressing button 120 located near the bottom of mobile device 10. Each corresponding device functionality may have corresponding "home" display objects displayed on the touch-sensitive display 102, and the graphical user interface environment of FIG. 1 can be restored by pressing the "home" display object.

The top-level graphical user interface is shown in FIG. 1 and can include additional display objects, such as a short messaging service (SMS) object, a calendar object, a photos object, a camera object, a calculator object, a stocks object, a weather object, a maps object, a notes object, a clock object, an address book object, and a settings object, as well as AR object 106. Touching the SMS display object can, for example, invoke an SMS messaging environment and supporting functionality. Likewise, each selection of a display object can invoke a corresponding object environment and functionality.

Mobile device 10 can include one or more input/output (I/O) devices and/or sensor devices. For example, speaker 122 and microphone 124 can be included to facilitate voice-enabled functionalities, such as phone and voice mail functions. In some implementations, loud speaker 122 can be included to facilitate hands-free voice functionalities, such as speaker phone functions. An audio jack can also be included for use of headphones and/or a microphone.

A proximity sensor (not shown) can be included to facilitate the detection of the user positioning mobile device 10 proximate to the user's ear and, in response, disengage the touch-sensitive display 102 to prevent accidental function invocations. In some implementations, the touch-sensitive display 102 can be turned off to conserve additional power when mobile device 10 is proximate to the user's ear.

Other sensors can also be used. For example, an ambient light sensor (not shown) can be utilized to facilitate adjusting the brightness of the touch-sensitive display 102. An accelerometer (not shown) can be utilized to detect movement of mobile device 10, as indicated by the directional arrow. Accordingly, display objects and/or media can be presented according to a detected orientation, e.g., portrait or landscape.

Mobile device 10 may include circuitry and sensors for supporting a location determining capability, such as that provided by the global positioning system (GPS) or other positioning system (e.g., Cell ID, systems using Wi-Fi access points, television signals, cellular grids, Uniform Resource Locators (URLs)). A positioning system (e.g., a GPS receiver) can be integrated into the mobile device 10 or provided as a separate device that can be coupled to the mobile device 10 through an interface (e.g., port device 132) to provide access to location-based services.

Mobile device 10 can also include a front camera lens and sensor 140. In a preferred implementation, a backside camera lens and sensor 141 is located on the back surface of the mobile device 10 as shown in FIG. 9. The cameras 140, 141 can capture still images and/or video. The camera subsystems and optical sensors 140, 141 may comprise, e.g., a charged coupled device (CCD) or a complementary metal-oxide semiconductor (CMOS) optical sensor, can be utilized to facilitate camera functions, such as recording photographs and video clips. Camera controls (zoom, pan, capture and store) can be incorporated into buttons 134-136 (FIG. 1.)

The preferred mobile device 10 includes a GPS positioning system. In this configuration, another positioning system can be provided by a separate device coupled to the mobile device 10, or can be provided internal to the mobile device. Such a positioning system can employ positioning technology including a GPS, a cellular grid, URL's, IMEO, pseudolites, repeaters, Wi-Fi or any other technology for determining the geographic location of a device. The positioning system can employ a service provided by a positioning service such as, for example, a Wi-Fi RSS system from SkyHook Wireless of Boston, Mass., or Rosum Corporation of Mountain View, Calif. In other implementations, the positioning system can be provided by an accelerometer and a compass using dead reckoning techniques starting from a known (e.g. determined by GPS) location. In such implementations, the user can occasionally reset the positioning system by marking the mobile device's presence at a known location (e.g., a landmark or intersection). In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. In other implementations, the positioning system can be provided by using wireless signal strength and one or more locations of known wireless signal sources (Wi-Fi, TV, FM) to provide the current location. Wireless signal sources can include access points and/or cellular towers. Other techniques to determine a current location of the mobile device 10 can be used and other configurations of the positioning system are possible.

Mobile device 10 can also include one or more wireless communication subsystems, such as a 802.11b/g/n communication device, and/or a Bluetooth™ communication device, in addition to near field communications. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc. Additional sensors are incorporated into the device 10, such as accelerometer, digital compass and gyroscope. Further, peripheral sensors, devices and subsystems can be coupled to peripherals interface 132 to facilitate multiple functionalities. For example, a motion sensor, a light sensor, and a proximity sensor can be coupled to peripherals interface 132 to facilitate the orientation, lighting and proximity functions described with respect to FIG. 1. Other sensors can also be connected to peripherals interface 132, such as a GPS receiver, a temperature sensor, a biometric sensor, or other sensing device, to facilitate related functionalities.

Port device 132, is e.g., a Universal Serial Bus (USB) port, or a docking port, or some other wired port connection. Port device 132 can, for example, be utilized to establish a wired connection to other computing devices, such as other communication devices 10, a personal computer, a printer, or other processing devices capable of receiving and/or transmitting data. In some implementations, port device 132 allows mobile device 10 to synchronize with a host device using one or more protocols.

Input/output and operational buttons are shown at 134-136 to control the operation of device 10 in addition to, or in lieu of the touch sensitive screen 102. Mobile device 10 can include a memory interface to one or more data processors, image processors and/or central processing units, and a peripherals interface. The memory interface, the one or more processors and/or the peripherals interface can be separate components or can be integrated in one or more integrated circuits. The various components in mobile device 10 can be coupled by one or more communication buses or signal lines.

Preferably, the mobile device includes a graphics processing unit (GPU) coupled to the CPU. While a Nvidia GeForce GPU is preferred, in part because of the availability of CUDA, any GPU compatible with OpenGL is acceptable. Tools available from Kronos allow for rapid development of 3D models.

The I/O subsystem can include a touch screen controller and/or other input controller(s). The touch-screen controller can be coupled to touch screen 102. The other input controller(s) can be coupled to other input/control devices 132-136, such as one or more buttons, rocker switches, thumb-wheel, infrared port, USB port, and/or a pointer device such as a stylus. The one or more buttons (132-136) can include an up/down button for volume control of speaker 122 and/or microphone 124, or to control operation of cameras 140, 141. Further, the buttons (132-136) can be used to "capture" and share an image of the event along with the location of the image capture.

In one implementation, a pressing of button 136 for a first duration may disengage a lock of touch screen 102; and a pressing of the button for a second duration that is longer than the first duration may turn the power on or off to mobile device 10. The user may be able to customize a functionality of one or more of the buttons. Touch screen 102 can, for example, also be used to implement virtual or soft buttons and/or a keyboard.

In some implementations, mobile device 10 can present recorded audio and/or video files, such as MP3, AAC, and MPEG files. In some implementations, mobile device 10 can include the functionality of an MP3 player, such as an iPod™. Mobile device 10 may, therefore, include a 36-pin connector that is compatible with the iPod. Other input/output and control devices can also be used.

The memory interface can be coupled to a memory. The memory can include high-speed random access memory and/or non-volatile memory, such as one or more magnetic disk storage devices, one or more optical storage devices, and/or flash memory (e.g., NAND, NOR). The memory can store an operating system, such as Darwin, RTXC, LINUX, UNIX, OS X, WINDOWS, or an embedded operating system such as VxWorks. The operating system may include instructions for handling basic system services and for performing hardware dependent tasks. In some implementations, the operating system handles timekeeping tasks, including maintaining the date and time (e.g., a clock) on the mobile device 10. In some implementations, the operating system can be a kernel (e.g., UNIX kernel).

The memory may also store communication instructions to facilitate communicating with one or more additional devices, one or more computers and/or one or more servers. The memory may include graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; GPS/Navigation instructions to facilitate GPS and navigation-related processes and instructions; camera instructions to facilitate camera-related processes and functions; other software instructions to facilitate other related processes and functions; and/or diagnostic instructions to facilitate diagnostic processes and functions. The memory can also store data, including but not limited to coarse information, locations (points of interest), personal profile, documents, images, video files, audio files, and other data. The information can be stored and accessed using known methods, such as a structured or relative database.

Figure 8:
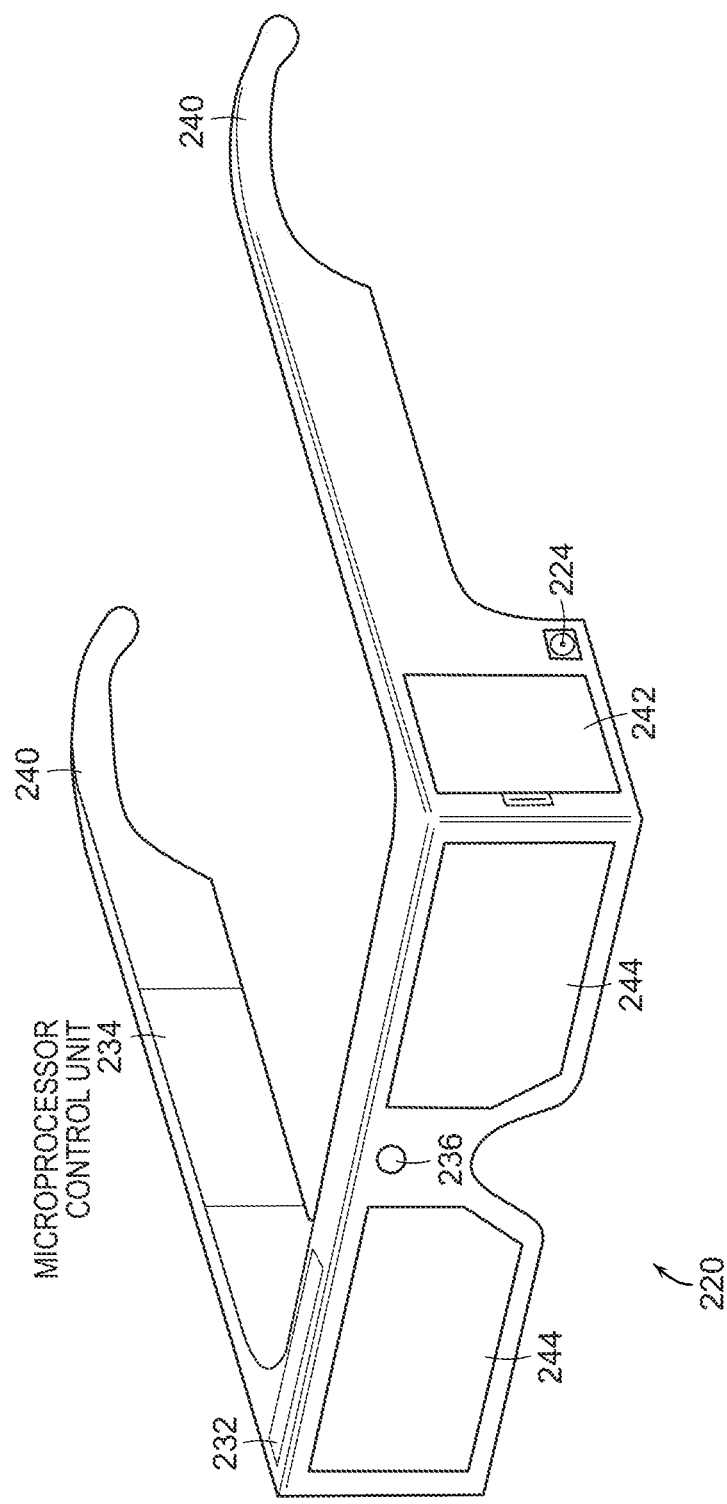
FIG. 8 is a perspective of the back side the smart phone of FIG. 1.

Portable device 220 of FIG. 8 is an alternative embodiment in the configuration of glasses or goggles and includes a GPS and patch antenna 232, microprocessor 234, and radio 236. Controls, such as the directional pad 224, are on the side frames (opposite side not shown). Batteries are stored in compartment 242. The displays are transparent LCD's as at 244. Examples of such a device are the MyVue headset made by MicroOptical Corp. of Westwood, Mass. (see, U.S. Pat. No. 6,879,443), Vuzix Wrap 920 AR, 1200 VR, and Tac-Eye LT available from Vuzix Corporation, Rochester, N.Y. A particular benefit of the use of wearable glasses such as the embodiment of FIG. 8 is the ability to incorporate augmented reality messages, e.g. point of interest overlays onto the "real" background. In the golf example, a golfer wearing glasses 220 can see the AR messages and selectively highlight a particular message and additional information relative to that message (e.g. wind used in club selection, next best club selection, status of other golfers rounds, etc.). See, e.g. U.S. Pat. Nos. 7,002,551; 6,919,867; 7,046,214; 6,945,869; 6,903,752; 6,317,127 (herein incorporated by reference).

III. Network Operating Environment

In FIG. 6, a depiction of real-time network 40 useful in many embodiments is shown. It should be understood that in many uses a real-time network environment as illustrated in FIG. 6 is not necessary. That is, information concerning an event can alternatively be recorded and uploaded to a social network server after the event. In the real-time embodiment of FIG. 6 participants/golfers 41 communicate with cell base station 42 preferably using the cellular network which can include one or more femtocells or picocells. While simple data can be transmitted on the control plane (e.g. GPRS) preferably the cell radio uses a data plan, i.e. the user plane. The location, communication, and other data is communicated between golfers 41 and social media server 44. Server 44 stores the position data of each golfer 41 communicated to cell base station 42, and other pertinent data such as golfer shot position, scores, etc. Such other data can, in addition to sensor data derived from device 10, comprise sensor data from the participant, such as from instrumented golf clubs. See, e.g., U.S. Publication Nos. 2011/0143848 and 2008/0051208 (incorporated by reference). In a preferred form, server 44 stores the points of interest or course database which is used to create many of the AR messages.

Other participants/golfers 41 can send messages to selected golfers or groups of golfers which are stored on server 44. For example, a location (green or feature) of a golf course can be "tagged" with an AR message to other golfers (e.g. "Joe hit OB here"). Of course, server 44 can store advertising messages as well for delivery to golfers, such as specials in the pro shop or "deal of the day" such as living social or Groupon opportunities. Server 44 can also be used for authentication of graphic devices 10 and enable selectable purchases from golfers or spectators (i.e. refreshments or for delivery or pickup at the turn, or balls, deal of day, etc). Server 44 can also process the incoming position data to increase the accuracy if desired. For example, server 44 can include its own base station GPS and apply a correction to a golfer's position if desired. However, in the embodiment of FIG. 6 using the cellular network, Assisted GPS using mobile station assistance is available and used, thus improving time to first fix, sensitivity and accuracy, so additional accuracy is not normally deemed necessary.

Radio 46 is used to communicate among the golfers 41 and spectators 48. For spectators in attendance, the cell network is preferably used. 4G cellular networks such as LTE, or Long Term Evolution, have download speeds (e.g. 12 mbps) surpassing WiFi and may become acceptable substitutes. For example, WiMax (Sprint>10 mbps); LTE (Verizon 40-50 mbps) (AT&T unknown); and HSPA+ (T mobile 21 mbps) (AT&T 16 mbps) appear acceptable 4G network speeds. In many cases, with high performance 4G cellular networks, the social media server 44 need not be local, i.e. proximate to the golf course. However, if a cell network is not used, the radio 46 of network of FIG. 6 can be local, i.e. a WiFi or 900 Mhz local area network is used. In this case radio 46 preferably uses WiFi (802.11 b/g/n) to transmit to golfers/spectators 48.

Special requests from golfers or spectators 48 can be made to server 44, such as for streaming video of a particular scene (e.g. a "flyover" of the hole), refreshment orders, memorabilia purchases, etc. This function is shown at 50, 52 in FIG. 6.

Some spectators 48 may be remote from the sporting event. In this case, server 44 can transmit the desired information over internet connection 49 to the club house, home computer or television remote from the event. While one embodiment has been described in the context of a spectator in physical attendance at the golf course with information broadcast by radio, the use of device 10 at remote locations is equally feasible. In another embodiment more suited for remote locations, for example, portable device 10 can be used at home while watching a golf event on TV, with the participant location and other information streaming over the internet. WiFi in the home is a preferred mode of broadcasting the information between the portable device and the network.

One function of the server 44 is to allow observation of a round by a golfer, either in real time or post play. That is, the views of FIGS. 2-5 can be posted to the server 44 and observed by a spectator 48 using any graphic device, including a personal computer, tablet, or a cell phone. Similar to using graphic device 10 coupled to the internet, a personal computer spectator can select the source or position of origination of the desired view, and the target or orientation from the source or target. Elevations, zoom, pan, tilt, etc. may be selected by the remote spectator as desired to change the origin viewpoint or size.

In "my view," for example, the remote location graphic device might display only information from the golfer's shot location 81. Alternatively, the spectator might want a selectable view, such as overhead in plan form, from behind the golfer (FIG. 7) or other location such as from the pin to the golfer's location. In any of these modes, the remote location spectator could zoom, pan or tilt as described above, freeze, slow motion, replay, etc. to obtain a selected view on the portable device 10.

While the preferred embodiment contemplates most processing occurring at device 10, different amounts of preprocessing of the position data can be processed at server 44. For example, the participant information can be differentially corrected at the server (e.g. in addition to WAAS or a local area differential correction) or at device 10 or even information post-processed with carrier phase differential to achieve centimeter accuracy. Further, it is anticipated that most of the graphics rendering can be accomplished at portable device 10, but an engineering choice would be to preprocesses some of the location and rendering information at server 44 prior to broadcast. In particular, many smart phones and handheld computers include GPU's which enable photorealistic rendering and the developers have access to advanced tools for development such as OpenGL and CUDA.

Mobile device 10 of FIGS. 1 and 9 preferably accompanies some of golfers 41 of FIG. 6 in attendance at the course. Devices 10 communicate over one or more wired and/or wireless networks 46 in data communication with server 44. In addition, the devices can communicate with a wireless network, e.g., a cellular network, or communicate with a wide area network (WAN), such as the Internet, by use of a gateway. Likewise, an access point associated with Radio 46, such as an 802.11b/g/n wireless access point, can provide communication access to a wide area network.

Both voice and data communications can be established over the wireless network of FIG. 6 and access point 46 or using a cellular network. For example, mobile device 10 a can place and receive phone calls (e.g., using VoIP protocols), send and receive e-mail messages (e.g., using POP3 protocol), and retrieve electronic documents and/or streams, such as web pages, photographs, and videos, over the wireless network, gateway, and wide area network (e.g., using TCP/IP or UDP protocols). Likewise, mobile device 10 can place and receive phone calls, send and receive e-mail messages, and retrieve electronic documents over access point 46 and the wide area network. In some implementations, mobile device 10 can be physically connected to access point 46 using one or more cables and the access point can be a personal computer. In this configuration, mobile device 10 can be referred to as a "tethered" device.

Mobile devices 10 can also establish communications by other means. For example, wireless device 10 can communicate with other wireless devices, e.g., other wireless devices 10, cell phones, etc., over a wireless network. Likewise, mobile devices 10 can establish peer-to-peer communications, e.g., a personal area network, by use of one or more communication subsystems, such as the Bluetooth™ communication device. Other communication protocols and topologies can also be implemented.

In use in the play of golf, it is believed preferable to use a real environment as the background, such as a digital image captured by backside camera 141 of FIG. 9. In many cases, this real background environment can be augmented with other golfers pictures or archived video. Typically, the golfer 41 would activate one of the buttons 134-136 at each shot so that the spectators 48 could more easily follow the round.

In other embodiments, a virtual environment may be used as the background. In such cases, server 44 preferably uses the OTOY, Gaikai, or OnLive video compression technology to transmit the participant position information the virtual background environment, as well as the AR objects, such as each car 54. OTOY (and Gaikai and OnLive) are cloud based gaming and application vendors that can transmit real time photorealistic gaming to remote gamers. Such companies that render photorealistic 3D games for realtime remote play are Otoy, see, e.g., www.otoy.com; OnLive, see, e.g., en.wikipedia.org/wiki/OnLive; and Gaikai, see, e.g., technabob.com/blog/2010/03/16/gaikai-cloud-based-gaming. Onlive, for example, advertises that with 5 mbps it can transfer 220 frames per second with 12-17 ms latency, employed advanced graphics—ajax, flash, Java, ActiveX.

The goal is high performance game systems that are hardware and software agnostic. That is, a goal is intense game processing performed on a remote server and communicated to the remote user. Using such cloud based gaming technology, smart phones 10 can run any of the advanced browsers (e.g. IE9 or Chrome) running HTML5 that support 3D graphics. However, other AR specific browsers can alternatively be used, such as available from Layar, Junaio, Wikitude, Sekai Camera or Mixare (www.mixare.org). While OTOY (and Gaikai and OnLive) promise no discernable latency in their gaming environment, server 44 for the golf event of FIG. 6 is preferably placed at the venue of the event.

Therefore, the amount of processing occurring at server 44 versus device 10 is a design choice based on the event, the background, the radio network available, the computational and display capability available at device 10 or other factors.

Figure 7:
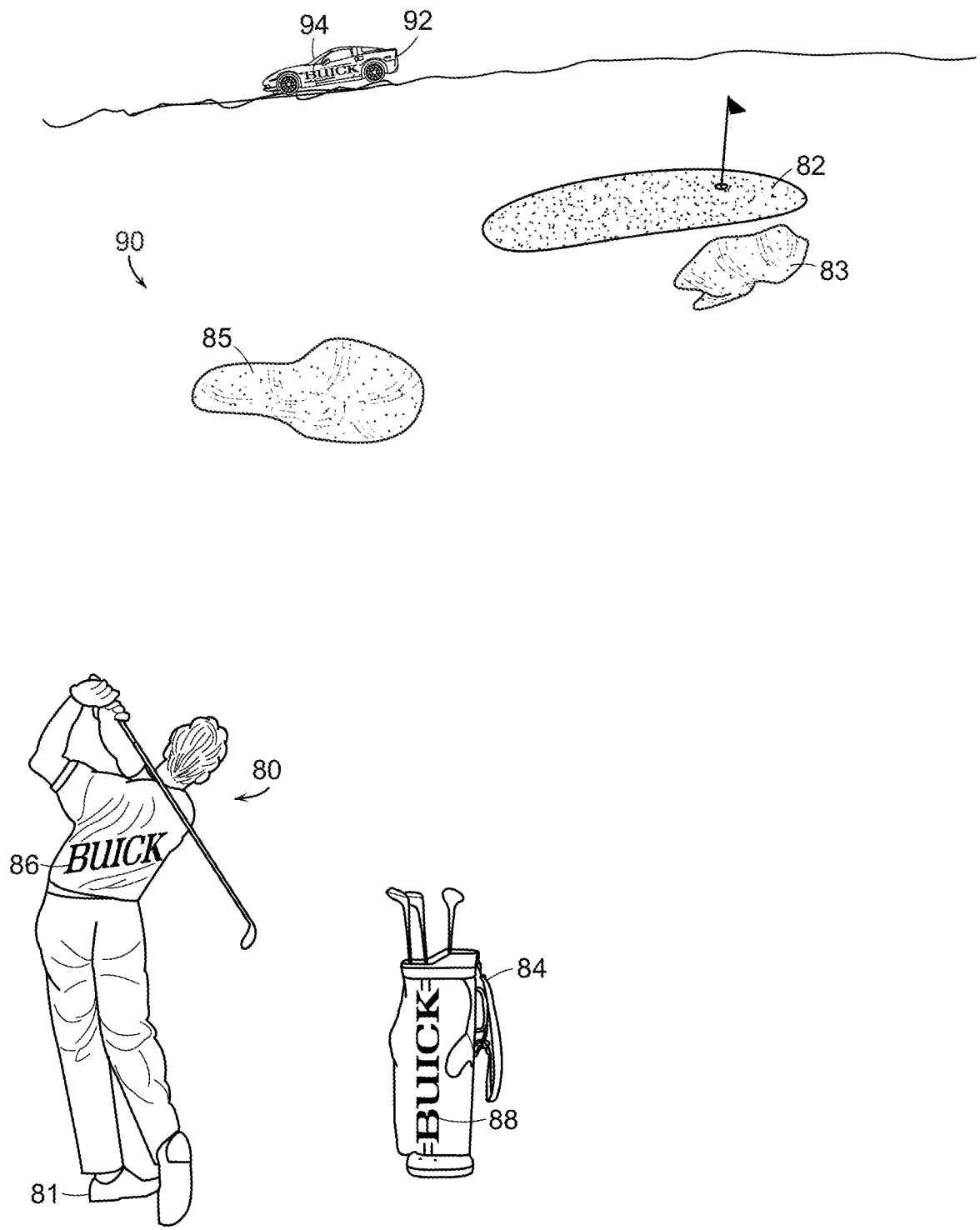
FIG. 7 is a perspective view of a golf hole from a selected location, similar to FIG. 2.

In addition the content of the advertisement messages can be changed based on context. Such smart phones 10 have not only machine ID's, but also search history, location history, and even personal information. Further, the user might be identified based on social media participation—e.g. Facebook or Twitter accounts. Such information is considered "context" in the present application, along with the typical demographics of an event and "marketing factors" as previously discussed. That is, the event might have its own context which indicates the demographic profile of most of the spectators at the event. A golf match might have a context of golf spectators with adequate disposable income to purchase a vehicle. Therefore, advertising a Buick as shown in FIG. 7 makes advertising sense. See, U.S. patent application Ser. No. 13/152,476 (incorporated by reference).

In a preferred embodiment, a golfer 41 would "capture" his round using the camera function and including his GPS coordinates and other sensor data (such as club selection) as described above. The golfer 41 would post his round in real-time to the social media server 44. Using a social media relationship, a golfer 41 would "host" a round and provide access to spectators 48, who might be selected followers or friends on the social media site. Preferably, the golfer 41 is the "host" of the event and the spectators 48 are the gallery. The spectators 48 can comment during play of the round such as providing instruction or critique, or even betting on outcomes with the golfer 41 during play or presenting challenges to the golfer 41.

The round can also be used in addition to, or in lieu of, the real-time round. That is, the golfer 41 can post a round to a social media server 44 after play and notify his followers/spectators 48 of the commencement of the round. During replay, prior comments can be observed and new comments posted. In this way, the golfer 41 is sharing his round with spectators 48 either in real-time or historically. Advantageously, a number of golfers 41 can participate in the same round, showing their outcomes and comments to the spectators 48.

While the play of golf has been used to illustrate the use of the network 40 of FIG. 6, it should be understood that the event is not limited to a round of golf. That is, many sporting events can be posted to a social media server 44 for review and comment. Biking, car racing, motocross (or any motorized sports), running, sailing, skiing, boating, as well as non-sport related activities can be shared via the social media server 44. For example, the user 41 of FIG. 6 could be a hiker on the Appalachian trail sharing the hike ("event") with remote spectators 48 in real-time and after the hike. The event is not limited to amateur sports and can include professional sports as well.

While a preferred embodiment has been described as using a digital photographic image captured by backside camera 141, other digital images can be used as a background, such as a virtual rendered background or the actual image seen through glasses 220 or stored video or panorama. Particularly, for courses where an artificial reality environment is available, a virtual background may be preferable as it may facilitate replay and sharing of round recreations. In this alternative form, the background environment is preferably an artificial reality 3D model of the golf course as described above. The golfer is represented by an avatar traversing the golf course. Thus, spectators viewing the golf course can track the progress of the golfer along the course from any number of spectator selected viewpoints, including the viewpoint of the golfer, as well as select video feeds from camera 140 or 141.

For other sporting events and activities (such as gaming or hiking the Appalachian trail), applied to venues where an artificial reality environment is available or can be created, a virtual background may be preferable as it may facilitate replay and sharing of the event. In this alternative form, the background environment is preferably an artificial reality 3D model of the venue, i.e. a virtual venue. The sport or activity participant is represented by an avatar traversing the venue. Thus, spectators viewing the event or activity can track the progress of the participant as the participant moves around the virtual venue from any number of spectator selected viewpoints (or live feed viewpoints), including the viewpoint of the participant, as well as select images of the venue. For example, spectators can view the avatar of the participant in various locations around the venue and view various viewpoints.

IV. Graphics

The graphics generated on screen 102 can be 2D graphics, such as geometric models (also called vector graphics) or digital images (also called raster graphics). In 2D graphics, these components can be modified and manipulated by two-dimensional geometric transformations such as translation, rotation, scaling. In object oriented graphics, the image is described indirectly by an object endowed with a self-rendering method—a procedure which assigns colors to the image pixels by an arbitrary algorithm. Complex models can be built by combining simpler objects, in the paradigms of object-oriented programming. Modern computer graphics card displays almost overwhelmingly use raster techniques, dividing the screen into a rectangular grid of pixels, due to the relatively low cost of raster-based video hardware as compared with vector graphic hardware. Most graphic hardware has internal support for blitting operations and sprite drawing.

Preferably, however, the graphics generated on screen 102 are 3D. OpenGL and Direct3D are two popular APIs for the generation of real-time imagery in 3D. Real-time means that image generation occurs in "real time" or "on the fly"). Many modern graphics cards provide some degree of hardware acceleration based on these APIs, frequently enabling the display of complex 3D graphics in real-time. However, it's not necessary to employ any one of these to actually create 3D imagery. The graphics pipeline technology is advancing dramatically, mainly driven by gaming applications enabling more realistic 3D synthetic renderings of FIGS. 1-5.

3D graphics have become so popular, particularly in computer games, that specialized APIs (application programmer interfaces) have been created to ease the processes in all stages of computer graphics generation. These APIs have also proved vital to computer graphics hardware manufacturers, as they provide a way for programmers to access the hardware in an abstract way, while still taking advantage of the special hardware of this-or-that graphics card.

These APIs for 3D computer graphics are particularly popular:
  OpenGL and the OpenGL Shading Language
  OpenGL ES 3D API for embedded devices
  Direct3D (a subset of DirectX)
  RenderMan
  RenderWare
  Glide API
  TruDimension LC Glasses and 3D monitor API OpenGL is widely used and many tools are available from firms such as Kronos. There are also higher-level 3D scenegraph APIs which provide additional functionality on top of the lower-level rendering API. Such libraries under active development include:
  QSDK
  Quesa
  Java 3D
  JSR 184 (M3G)
  NVidia Scene Graph
  OpenSceneGraph
  OpenSG
  OGRE
  Irrlicht
  Hoops3D Photo-realistic image quality is often the desired outcome, and to this end several different, and often specialized, rendering methods have been developed. These methods range from the distinctly non-realistic wireframe rendering through polygon-based rendering, to more advanced techniques such as: scanline rendering, ray tracing, or radiosity. The rendering process is computationally expensive, given the complex variety of physical processes being simulated. Computer processing power has increased rapidly over the years, allowing for a progressively higher degree of realistic rendering. Film studios that produce computer-generated animations typically make use of a render farm to generate images in a timely manner. However, falling hardware costs mean that it is entirely possible to create small amounts of 3D animation on a small processor, such as in the device 10. Driven by the game studios, hardware manufacturers such as ATI, Nvidia, Creative Labs, and Ageia have developed graphics accelerators which greatly increase the 3D rendering capability. It can be anticipated that in the future, one or more graphics rendering chips, such as the Ageia Physx chip, or the GeForce GPU's will enable full rendering at the device 10.

While full 3D photorealistic rendering is difficult with the device 10 described herein standing alone, advances in processing and rendering capability will enable greater use of 3D graphics in the future. In the golf application, a golfer object and a course object (e.g., Doral or Augusta National) can be rendered in advance and stored, making realistic 3D graphics possible. However, a preferred form is to use a cloud-based gaming provider, such as OTOY, OnLive, or Gaikai at server 44 networked to devices 10.

See, U.S. patent application publication Ser. No. 12/146,907 (incorporated by reference).

V. Operation and Use

A primary function of AR messages is to convey the information to the golfer as illustrated in FIGS. 2-5 and also to the other participants and spectators 48 observing the event. Preferably, a golfer can switch between a plan view and the perspective view described herein. A good example of such information is distances to a feature, such as a hazard or green or pin placement. In the illustrated embodiment, the AR golf application 106 on smart phone 10 is launched and the course information (including feature locations, such as points of interest) and other information is downloaded, if not already stored in memory. In one form, the information can be downloaded remotely over the internet. In another form, the information can be downloaded over a cell network. In another form, the course information can be downloaded in proximity to the course using, e.g., WiFi, Bluetooth, or Near Field Communication (NFC). The course information can be downloaded one time for later re-use, or can be downloaded over the network of FIG. 6 before or as the round is being played.

In any case, the GPS of smart phone 10 provides accurate position of the golfer 80 when accompanying the golfer (FIG. 2). The distance to the pin or cup on the green 82 can be displayed using the AR message 94 of FIG. 3. Of course any arbitrary location on the green can be used to approximate the position of the cup, such as center of green, front or back of the green, or a grid sector of the green. The GPS location 81 of the golfer 80 is compared with the stored location of the target, e.g. pin placement or green center and the difference is computed and displayed as at 98. The golfer 80 positions the smart phone 10 so that the camera 141 is pointed in the direction of the target, e.g., green 82 in FIGS. 2-3. The camera 141 captures the background environment and AR messages 92, 94 displayed when in the camera field of view. The compass in smart phone 10 senses when the camera 141 is directed toward the point of interest and the phone is in an upright orientation (e.g. using the gyroscope). The difference computation is displayed as a yardage to the golfer as AR messages 92, 94, 98 as shown at FIGS. 3-4. For AR message 96, the current location 80 is used to look up information from a database in memory and an appropriate pro tip is displayed as at 96.

FIGS. 4 and 5 illustrate different club recommendations based on different golfers. In a preferred example, a golfer loads his personal profile into device 10, and thereafter a club is recommended after the golfer pushes a dedicated button 134-136. The profile might specify what clubs and ball the golfer is using and his shot distribution for each club. For example, from range practice the golfer knows he hits his 7 Iron between 145 and 165 yards with a 20 yard diameter 50% of the time (155 yard with a 20 yard CEP), i.e., 50% of his 7 iron shots fall within the target area 120 illustrated in FIG. 4. Other parameters can be used as an alternative to CEP (Circular Error Probable or 50%), such as RMS (Root Mean Square, 63-38%) or 2RMS (95-98%), which modify the size (probability) of the circle and shape of the target message 120. Alternatively, different shapes can be used to more accurately reflect the personal profile if, for example, the along track error is out of proportion to the cross track error, i.e., the shape of the target 120, 124 can be non-circular, such as a rectangle or ellipse. The distance, "155" yards, can be displayed within the target 120 if desired.

Different methods have been devised for recommending how to play a golf hole, but the idea is the object of the game of golf—minimize the score for the hole. In a simple example, consider FIG. 4. For the below average golfer of FIG. 4, the method hereof would compute the likely score of using a 3 iron from golfer location 81 as 4.78 under Option A below, while the likely score using the 7 iron of Option B is 4.34. Therefore, the method hereof recommends option B. This is partly explained because the golfer's shot distribution for a 3 Iron from location 81 leads to an end result in the fairway only 50% of the time, while the golfer will end up in the rough 20% of the time and the lake 85 30% of the time. (For simplification, this example shows the golfer's personal profile as a 60 yard lob wedge and 90 yard sand wedge of about equal CEP, putting success close to equal.)

Option A

| 3 Iron | 190 yds-30 yd CEP | Consequence | |
|---|---|---|---|
| Fairway | 50% | 1 | .5 |
| Hazard | 30% | 2 | .6 |
| Rough | 20% | 1.4 | .28 |
| | | | 1.38 |
| 60 yard Lob Wedge | | Consequence | |
| Fairway | 70% | 1 | .7 |
| trap | 10% | 1.2 | .12 |
| Rough | 20% | 1.4 | .28 |
| | | | 1.1 |

Total = 2.48 plus 2.3 putts

Option B

| 7 Iron layup | 155 yds-20 Yd CEP | Consequence | |
|---|---|---|---|
| Fairway | 100% | 1 | 1 |
| Hazard | 0% | 2 | |
| Rough | 0% | 1.4 | |
| | | | 1 |

-continued

| Full Sand Wedge | | Consequence | |
|---|---|---|---|
| Fairway | 80% | 1 | .8 |
| trap | 10% | 1.2 | .12 |
| Rough | 10% | 1.4 | .12 |
| | | | 1.04 |

Total = 2.04 plus 2.3 putts

Note that if the golfer of FIG. 4 had the ability (shot distribution) of the golfer of FIG. 5 then the method hereof would recommend a 3 Iron. The golfer of FIG. 5 has a 3 Iron profile of 205 yards with a 30 yard CEP. Several different methods for club recommendations have been developed. See, U.S. Publication Nos. 2003/0149496; 2005/0227791; 2007/0129178 (incorporated by reference). The selection of algorithm and probability distribution is a matter of design choice.

Other profiles can be used. For example, the course may have profile data for "beginner," "average," or "good" handicap golfers without regard to equipment. Advantageously, whatever profile is used can be adjusted based on factors, such as wind speed and direction, elevation difference between the target and the golfer location, density altitude, and any equipment differences. Equipment in play might call for slight adjustments based on the type of ball and type of club. Use of network 40 of FIG. 6 is particularly useful for recommending clubs based on environmental factors. That is, an environmental correction can be transmitted to golfers 48 or club selections can be computed and transmitted to individual golfers 41.

As illustrated in FIG. 7, advertising or product placements can be inserted as an AR message if desired. For example, FIG. 7 illustrates a replay mode where golfer 80 includes an ad message 86 on his shirt back. Additionally, ad message 88 is inserted on the bag 84. Alternatives are possible for the placement of the ads, so the message 86 is geo-referenced to the position of the player 80 using GPS and object recognition. That is, the player 80 has a GPS unit 10 on his body and the ad message 86 is inserted into an AR layer proximate the GPS position using object recognition for final registration with the player's shirt. Bag 84 is identified using object recognition and message 88 is placed on bag 84.

FIG. 7 also illustrates a product insert into the AR layer. In FIG. 7, car 92 is inserted into the display in the AR layer. On car object 92, ad message 94 is inserted. AR messages 92, 94 can be displayed near the green 82 of FIGS. 3, 4, 5. Such product placement or other AR message can occur at convenient geo-referenced locations on the golf course. Ad messages 86, 88, and 94 as well as product placement 92, can be inserted into the perspective views such as FIGS. 3, 4 and 5 where any digital image is used as the background.

While a preferred embodiment has been described as using a digital photographic image captured by backside camera 141, other digital images can be used as a background, such as a virtual rendered background or the actual image seen through glasses 220 or stored video or panorama. Particularly, for courses where an artificial reality environment is available, a virtual background may be preferable as it may facilitate replay and sharing of event replay within the selected social group.

There are a number of contests that are conducive to use of the method and system of the present invention. Popular golf games have heretofore been limited largely to members of a golfer's playing group. Using the system and methods hereof, the "group" can be expanded to other participants 41 and spectators 48, even separated by time and membership in the social group. For example, select information can be shared or published with groups as more fully described in U.S. Pat. No. 7,478,078 and U.S. Publication Nos. 2008/0036653; 2011/0142016; 2010/0070758; 2011/0098928; and 2009/0144392 (incorporated by reference herein).

A simple "corporate outing" might include contests for members of a corporate group based on: a) closest to the pin on a selected par 3; b) longest drive in the fairway on a selected hole; c) low total; or d) low handicap total; etc. Using the system and methods hereof, "outings" are facilitated. For example "outing" can be composed of ad hoc groups formed by any golfer that wants to participate with a tee time between 10-12. Further, the group might comprise any member of a golfer's social network group, such as a church group, e.g., that plays on Thursday—Saturday in June.

The system and methods hereof allow for enhanced visualization of contests, easier logistics, and real time information. For example, a golfer might choose to participate in an "outing" when downloading the course information or "checking-in" with the course. Upon arrival at the contest for "closest to the pin" display 102 will show the golfer on the tee an AR message of the current leader of this contest, as well as the leader's distance from the cup or target.

In another example, a target such as area 120 of FIG. 4 can be displayed to all members participating in an "outing" and the contest is to come closest to the center of the target or bulls-eye. Golfers 41 participating in the outing "mark" their resulting shot ending location (using a button 134-138) and the results are transmitted through network 40 to the golfers in the participating group. Additional AR messages can be selectively published to golfers participating in the outing and/or spectators 48, such as geo-referenced tags ("Joe hit OB here") to general AR messages ("Joe won target on hole 5 at 8 yards") to advertising messages ("Deal of Day for Hole 7—lunch at Maudie's today—two people—$12, BUY NOW"). In addition to providing a photo image background view from camera 141, the participant can also provide an image of participant's face using camera 140. This is particularly useful if the participant is a pro or celebrity.

Figure 12:
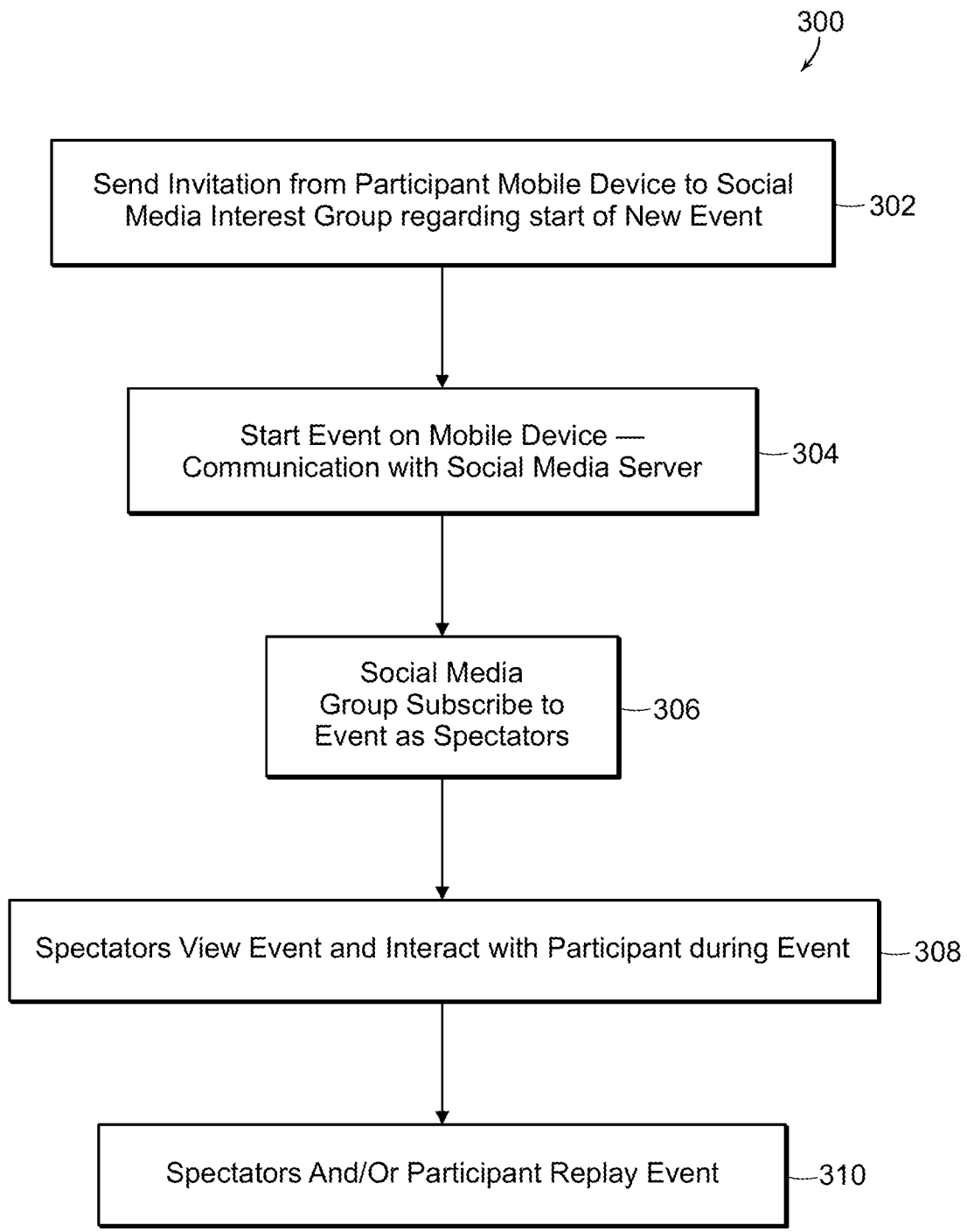
FIG. 12 is a flow chart of an event.

In broad form, and in reference to FIG. 12, in establishing an event 300, the participant 41 sends an invitation to a social media interest group regarding the start of an event as at 302. For example, participant can post the upcoming event to the participant's social media interest group such as participant's Facebook page or by tweeting to a select group, or other methods announcing the about to commence event. Before the event, participant 41 selects the application 106 on device 10 (FIG. 1) as shown at step 302 of the flowchart 300 of FIG. 12. Members of the social network can elect to become spectators to the event, preferably in real time.

During the event, spectators can communicate with the participant, as well as view in perspective the event from the various selected positions, such as participant positions. Further, the spectators can see many, if not all, of the AR messages. Additionally, the spectators can award "compensation" to the participant based on the participant's activities. Such activities for golf could be hitting a target, a sandie, a save, a birdie, etc. Examples of compensation include virtual goods, virtual services, money, awards, trophies, credits, points, and donations to a charity.

Example 1: Gallery Application

Bob has a tee time to play a round of golf today. His wife Jane is playing at the same course earlier in the day and his brother Bill is at home watching the football game.

Both Jane and Bill want to actively follow Bob's golf round.

When Bob gets to the course he activates and logs into the Golf Gallery application 106 on his smart phone 10 as seen in FIG. 1. Part of the log-in process sends a notification through a social media server 44 (FIG. 6) to members of Bob's social network to join his "event," i.e., creating a virtual gallery for today's round. In this case, Bob's invited group is his entire social network.

Another example might have Bob inviting only those in his social network that play golf. In still another example, Bob could expand the spectator group to anyone in a defined range of the golf course who has installed the Golf Gallery application 106.

Jane, who is already on Hole #8 received a notification on her cell phone 10 to join Bob's gallery. She accepts and activates the Golf Gallery application 106.

George is a friend of Bob's who has completed his round at the course and is having lunch in the course restaurant. George is a member of Bob's social network and gets an alert that Bob is at the course and about to start a round. George chooses to join Bob's gallery by activating the Golf Gallery application 106.

Bill receives a notification on his iPad while on the couch watching the Cowboys/Giants game. Bill chooses to join Bob's gallery by activating the Golf Gallery application 106 on his iPad. Additionally, Bill responds with a $10 Challenge BET to Bill that he can't break 90. The challenge is communicated through the network of FIG. 6 to Bob's device 10.

Bob is able to view who has joined his gallery through the Golf Gallery application that is running on his GPS capable smart phone 10. He reads the Challenge BET notification from Bill and accepts the bet. That generates a notification to everyone else in the gallery, i.e. the spectators 48 that have elected to observe the event.

Jane get a notification of the Challenge Bet from Bill and Bob's acceptance. She uses her phone 10 within the application 106 to respond to both with a comment, "You can do it Honey!"

Bob begins his round using his smart phone 10 to capture golf game data (ball position, club used, score as well as environment images). The companion golf application provides him with rangefinder information and tips with AR enhancements as described above.

Jane, George, and Bill are able to view Bob's play, in a real environment as captured by camera 41 at each shot. They are also able to view the AR enhancements that are visible to Bob. In alternative embodiments, the background environment can be artificial which allows Jane, George, and Bill the option to view Bob's play from a number of perspectives (behind him, from above, from the target/green).

On the first tee Bob records his position and that he is hitting a driver. He them hits his drive 300 yards into the middle of the fairway. When he gets to his ball and records his position by selecting a button (132-136) with the device oriented to the green 82. An AR message notifies the gallery (Bill, George and Jane):

[Bill: Hole #1/Shot 1: 300 yard drive—fairway]

Bob, George and Jane view the notification. Additionally, they can view the image just captured by Bob when he recorded his position.

Jane selects an "Applause" option which generates a response to Bill that is displayed in aggregate on his device 10.

Bob selects the "Applause" too and also selects the VIEW option to see Bill's ball position on Hole 1 animated with a virtual or actual image/environment such as shown in FIG. 3. He sends Bill a message, "You Da Man . . . Don't hit into that big trap by the green" that is also visible to everyone in the gallery.

Bill goes onto to birdie hole #1. When that score is recorded another notice is sent to the gallery. Bill also earns a virtual birdie medal that goes into his library of/trophies. These virtual goods can be converted into other rewards and incentives. These virtual good and virtual dollars (ex Facebook credits) can be used to settle bets and purchase virtual and physical goods and experience.

Jane gets the Birdie Hole #1 notification on her smart phone and shares/posts it with her Facebook network. Five members of her network read the post and click to join Bob's gallery. They have the option to review Bill's round history first or pick up his round LIVE. All five pick the LIVE option.

Bill gets a notification of additional members to his Gallery (now 8 total) Bill broadcasts a note to the entire gallery, "I'm gonna break the course record today"

On Hole 3, Bill is having trouble deciding which club to hit. He broadcasts a POLL to the entire gallery:

[150 yards to pin on Hole 3, all carry, 5 mpg wind at my back: which club to hit: 1.) 8 iron 2.) 9 iron]

The poll broadcast notification also includes a promotional offer from the course for a discounted round and a link to their website.

Three members of the gallery respond, two choose 8 iron and one chooses 9 iron. Bob get the notification and hits his 8 iron onto the green.

Bill is watching Bob's round with concern because it looks like Bob is on track to shoot a low score, which will cost him the bet. Bill knows that Bob prides himself on hitting long drive which can get him into trouble. Bill initiates a COURSE CHALLENGE event on hole #9 which is a long par 5.

Bill issues/inputs a Challenge that if Bob can hit a 325+ yard drive in the fairway he wins $10.

When Bob gets to Hole #10 the Challenge is presented to him and he accepts. On Bob's view of the hole the AR functionality now shows him the target area he needs to hit into to WIN the challenge. See, for example, targets 120 and 124 in FIGS. 4-5.

Bob over swings and pulls his drive left into the rough. When he get to his ball and records his position, he and the entire gallery get the notification that he has lost the challenge.

Bill responds with a snarky response: "Sucker"

Jane responds to Bill: "Leave my husband alone"

Bob comes to the 12$^{th}$ hole which today is part of a promotional long drive contest that club manufacturer Taylor Made is sponsoring at over 500 participating courses nationwide. The current long drive of the day is displayed for Bob using AR functionality, such as a target 120, 124 in FIGS. 4-5. Bob smacks a 328 yard drive, when he marks his ball his distance is registered and a notice is created announcing that Bob is now the current long drive for both the course and the state of Texas. Another virtual medal is awarded to his trophy case. Both are broadcast to his gallery along with a link to the contest leaderboard.

FIG. 12 is a flow chart illustrating an overview of the "gallery" example described above. In establishing an event 300, the golfer Bob sends an invitation to his social media interest group regarding the start of his round as at 302. In this example, the social media interest group is Bob's Facebook page by tweeting or posting the about to commence golf round. Before he tees off, Bob selects the application 106 on device 10 (FIG. 1) as shown at step 302 of the flowchart 300.

In this example, Bill, Jane and George all elect to "subscribe" to the event posted by Bob, as shown at 306. During the golf round, Bill, Jane, George and Bob all interact as described above and shown at block 308 of FIG. 12. While the golf round is viewed "live" in real time in this example, the round can be replayed by any spectator or participant as shown at 310.

Example 2: Sports Event Participation & Management Application

The Seven Rivers Golf Club in Arlen, Tex. is one of 50 courses hosting a charity golf tournament as part of a national event to raise money for Cancer Research.

Forty golfers will participate in ten "foursome" on Saturday at Seven Rivers. The other courses will host similar single day events on successive weekends.

As each golfer arrives at Seven Rivers for the tournament check-in, they have the option of launching the application 106 on their GPS enabled smart phone 10, or opt to use a cart-mounted GPS enabled iPad with wireless functionality in their cart.

Every golfer 41 in proximity of the course that has application 106 installed on their phone 10 will get a message: "Are you playing in the tournament today?" which will launch the "check-in" to join the event by activating application 106.

The application 106 check-in process identifies the individual using the registration information entered into application 106. The application 106 queries the social server 44 and identifies the team he is playing on along with the course and the event, which in this case is linked to the larger event that covers 50 courses and up 2000 golfers and 500 teams.

As detailed in other areas of the application, each golfer 41 will use the application 106 to record his and his teams performance, experience AR enabled information and game enhancements, social enhancements through the "gallery" functionality.

The activity data from every participant 41 in the tournament is recorded, consolidated and stored by a central server. This supports real time access by all participants 41 to LEADERBOARD functionality and the ability to dial down to current data on any course, team or individual.

The previous described Gallery functionality is now augmented by the ability to follow a particular team. This allows the course and tournament the ability to monitor and communicate (individually and collectively) to participants 41 wherever they are on the course.

Similarly the AR messages illustrated in FIGS. 3-5 can now be targeted to an individual, team(s), a location/course or an entire event.

Example 3: Spectator Following Celebrity/Pro Golfer

The National Charity Golf Event for Cancer Research has a number of professional golfers participating including 2011 US Open Champion Rory McIlroy.

McIlroy has announced to his social network on all the platforms he uses (Twitter, Facebook, Google+, YouTube) that he will be providing unique "inside the ropes virtual access" of his round in exchange for a donation to the Cancer Research organization. The Cancer Research organization also communicates this opportunity as part of their marketing campaign to promote the event.

Over 50,000 virtual spectators sign up to participate. Half pay the $5 fee with Paypal, the other half pay using a virtual social currency like Facebook credits. Each receives a digital badge keepsake for their donation.

McIlroy's caddie is outfitted with a head mounted camera and microphone that enables real-time streaming of image and voice content to the social media server. The video stream includes AR messages as described herein. The camera and audio control resides with McIlroy but some players allow the spectators in the gallery to control when the image and audio stream is on or off.

Similar to the previously described gallery example 1, spectators are able to view/participate in McIlroy's round with AR messages, see perspective views from McIlroy's current position and preferably select a perspective view from a number of different viewing locations or viewpoints.

On the 2nd hole, McIlroy has his caddie upload the following offer, "$5 donation if I can hit this drive to within 10 feet of the cup" that is broadcast to the entire gallery through the social media server. 5,000 members of the virtual gallery opt-in to the challenge.

McIlroy hits his 7 iron 2 feet from the cup. 40,000 members of the virtual gallery hit the applause button. 5,000 members are charged $5 yielding an additional $25,000 for the Cancer Research charity. Upon processing of their payment they each receive a digital badge "I bet against Rory and lost for a great cause".

Example 4: Ski Event

Figure 10:
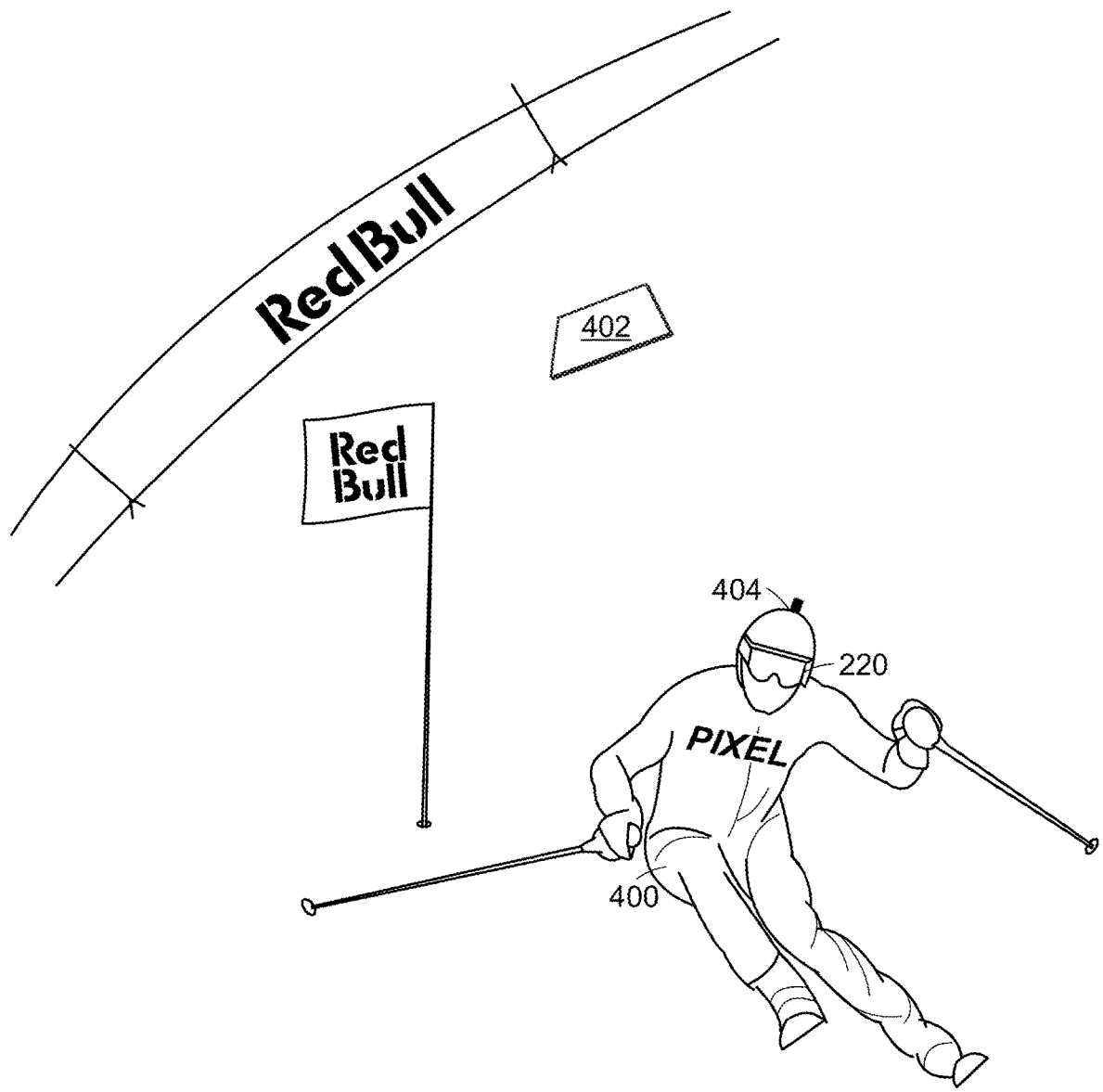
FIG. 10 is a perspective view of a ski event.

Turning to FIG. 10, the system and methods hereof are described using a ski race as an example of an event. Before the race, skier 400 invites spectators, such as a group or circle interested in skiing, in her social network to join or participate in her traversal of ski course 402 (sometimes referred to herein as "event venue"). In this embodiment, skier is wearing the device 10 (not shown), the goggles 220 of FIG. 8, and a helmet camera 404. The camera 404 is preferably a wireless camera connected by Bluetooth to device 10. Examples of such cameras are JonesCAM LX, Vuzix iWear CamAR available from Vuzix Corporation, Rochester, N.Y., AT-1Wireless available from Dogcam, and ContourGPS available from Contour HD.

In the embodiment of FIG. 10, the skier 400 invites spectators and then selects application 106 on device 10. The skier 400 then activates camera 404 to stream video to device 10 worn by the skier 400. The video is then streamed from device 10 to social media server 44 as shown in FIG. 6. In addition to the video, the device 10 transmits periodic GPS position data to the social media server 44. In this example, the background environment is preferably an artificial reality 3D model of the ski course 402 as described above. The skier 400 is represented by avatar traversing the ski course on the model. Thus, spectators viewing the ski race can track the progress of the skier 400 down course 402 from any number of spectator selected viewpoints, including the viewpoint of the skier 400, as well as select video feeds from helmet camera 404.

In addition, skier 400 has access to augmented reality overlays of the course 402 using goggles 220. In this example, spectators are not communicating with the skier during the run. However, a blue "ideal" fall line or traversal of the gates as well as a pace indicator are AR messages seen on the goggles 220 by skier 400.

Example 5: Bicycle Event

Figure 11:
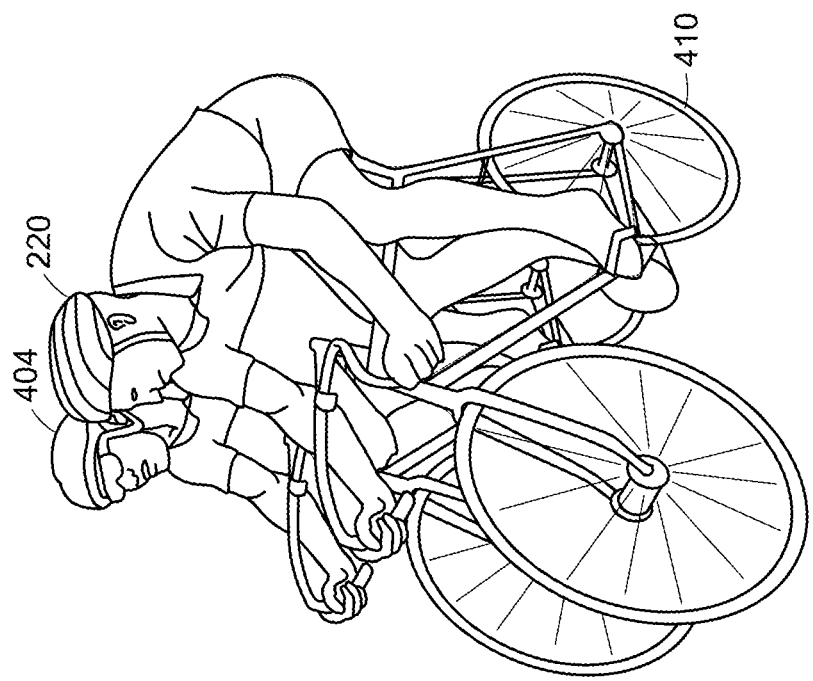
FIG. 11 is a perspective view of a bike event.
Figure 11:
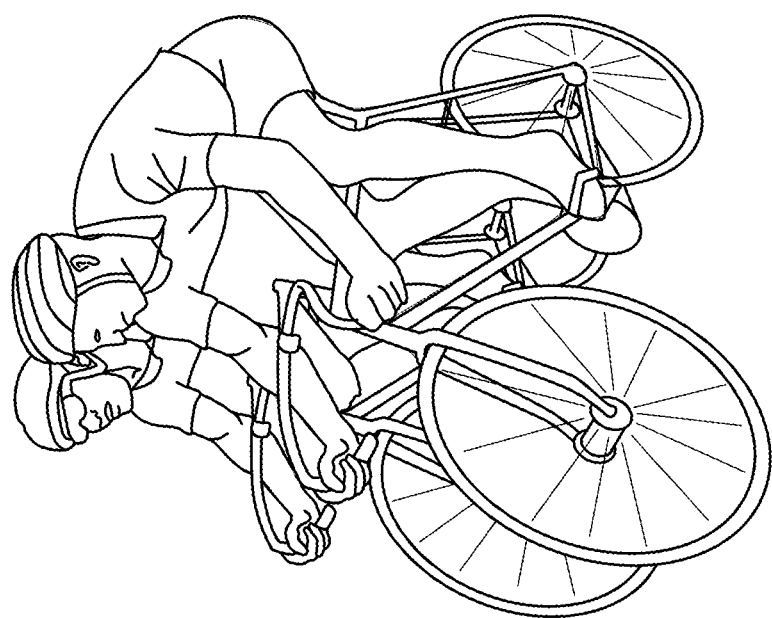

Turning to FIG. 11, a number of bicycle riders is shown, with rider 410 being the participant in this example. Of course, all riders could be participating with the same or different social networks or subsets or interest groups therein. In this embodiment, rider 410 is wearing the device 10 in a jersey pocket (not shown), the goggles 220 of FIG. 8, and a helmet camera 404.

In the embodiment of FIG. 11, the biker 410 invites spectators and then selects application 106 on device 10. The biker 410 then activates camera 404 to stream video to device 10 worn by the biker 410. The video is then streamed from device 10 to social media server 44 as shown in FIG. 6. In addition to the video, the device 10 transmits periodic GPS position data to the social media server 44. In this example, the background environment is preferably an artificial reality 3D model of the bike course as described above. The biker 410 is represented by avatar traversing the bike course. Thus, spectators viewing the bike course can track the progress of the biker 410 along the course from any number of viewpoints, including the viewpoint of the biker 410, as well as select video feeds from helmet camera 404.

In addition, biker 410 has access to augmented reality overlays of the course using goggles 220. In this example, selected spectators and the biker's coach can communicate with biker 410 during the race event. For example, the coach can dictate strategy and indicate other participants to pass or draft from, etc. Further, the AR messages can include grade, preferred path information, elapsed time, distance traveled, distance to go, actual time, actual pace, desired pace and any other desired performance parameters or bike sensor data. Some or all AR messages can be shared with some or all of the spectators.

Example 6: Other Events

While described above for a golf event, ski event, and bike event, the systems and methods hereof can also be used for a variety of events, such as walk/running or hiking events, biking events, BMX, surfing, skate board, boating/sailing events, fishing, hunting, driving events, kayaking, ski diving, any powered events including aerobatics, etc. Thus, while an event is preferably a participatory sporting event, it can include recreational or social events such as hiking or sight seeing.

What is claimed:

1. A method of viewing a sport or activity event in virtual reality where a virtual object overlays a virtual venue comprising an artificial background environment, comprising:
    operating glasses, having a display that is not a see through display, worn by a sport participant to view a feature or object overlaid a virtual venue in a perspective view;
    determining the virtual position of said sport participant on a virtual venue during play;
    comparing the position of a virtual feature on said virtual venue with said sport participant virtual position;
    viewing, on the glasses display, in real time during play an artificial message geo-referenced to a virtual location or virtual object at said virtual venue in said perspective view, wherein said artificial message overlaid said virtual venue is viewed on the glasses display.

2. The method of claim 1, wherein said artificial message comprises a distance overlaid at least a portion of the virtual venue as a background environment.

3. The method of claim 1, wherein said artificial message is geo-referenced to at least a portion of a virtual environment of the virtual venue as a background environment.

4. The method of claim 1, wherein said artificial message is transmitted to spectators.

5. The method of claim 1, wherein changing the view of said artificial message comprises changing the view point to the location of a feature.

6. The method of claim 1, including additional participants wearing glasses, said additional participants viewing a perspective view of the virtual venue.

7. The method of claim 1, the sport event or activity comprising at least one of the following: golf, ski, bike, walk, hike, surf, skateboard, boat, sail, fish, hunt, drive, kayak.

8. The method of claim 1, wherein a spectator performs said viewing the artificial message step.

9. The method of claim 1, said virtual object comprising another virtual sport or activity virtual participant.

10. The method of claim 1, including a plurality of spectators viewing said virtual sport or activity during play.

11. The method of claim 1, said geo-referenced artificial message being fixed to said virtual location or virtual object by associating the artificial message with the virtual location or virtual object.

12. Glasses wearable by a virtual sport or activity participant during the play of virtual sport or activity in virtual reality comprising:
    a memory storing the virtual position of the sport or activity participant at a virtual venue;
    a memory storing the virtual location of one or more virtual features or virtual objects of said virtual venue;
    a processor operable for comparing said virtual sport or activity participant virtual position with the location of a virtual feature or virtual object; and
    a display that is not a see through display operable to view a perspective view of said virtual feature or object overlaid said virtual venue during play from said sport participant virtual position at said virtual venue, said display operable to show an artificial message overlaid on a virtual background, and
    wherein said display is operable to view on the display at least a portion of said virtual venue as part of said virtual background and to view said artificial message geo-referenced to a virtual location or virtual object of said portion.

13. The glasses of claim 12, wherein said artificial message includes an indicator of the location of the feature in said sport participant's perspective view of said virtual venue.

14. The glasses of claim 12, wherein said feature is a virtual target location at the virtual venue.

15. The glasses of claim 12, wherein said artificial message is geo-referenced to an object.

16. The glasses of claim 12, wherein said perspective view background of said virtual venue comprising a virtual environment.

17. The glasses of claim 12, wherein perspective view background of said virtual venue includes an artificial rendering.

18. The glasses of claim 12, including a tethered computer wherein a memory includes a map of the virtual venue being played, and said sport participant can operate the glasses to display a plan view of said map on said display.

19. The glasses of claim 12, wherein a memory includes a database having feature locations and a plurality of advertisements.

20. The glasses of claim 19, wherein one of the plurality of advertisements is downloaded from the database and viewed on said display to overlay said perspective view.

21. The glasses of claim 20, wherein one of the plurality of advertisements is downloaded based in part on information related to said sport participant.

22. A method of using glasses worn by a sport or activity participant during play of a virtual venue, comprising:
   determining a virtual position of said sport or activity participant on said virtual venue;
   comparing said sport or activity participant virtual position with a virtual target location of said virtual venue to determine a distance between said sport or activity participant virtual position and virtual target location;
   displaying on the glasses, a perspective view of said virtual venue from said sport or activity participant virtual position on said virtual venue towards said virtual target location, wherein said perspective view is not an overhead plan view and the glasses are not see through; and
   viewing on the display an artificial message geo-referenced to a virtual location or virtual object on said perspective view overlaid said virtual venue including said distance to approximately the virtual target location.

23. The method of claim 22, including retrieving from a memory a virtual environment of said virtual venue and displaying the virtual environment as at least part of the background on the glasses.

24. The method of claim 22, including inserting an advertising message on said perspective view.

25. The method of claim 22, viewing other sport participants at said virtual venue.

26. The method of claim 22, said glasses including a tethered device, said glasses being connectable to a server.

27. The method of claim 22, said artificial message comprising text from a member of the sport participant's social network.

28. The method of claim 22, including a virtual product placement on said perspective view.

29. A method of displaying messages on glasses worn by a sport or activity participant during virtual reality play of sport or activity at a virtual venue, comprising the steps of:
   connecting the glasses, the glasses are not see through, with a server establishing communication between said glasses and said server;
   receiving information concerning a virtual feature or object of said virtual venue on said glasses from said server;
   viewing on the glasses during play of said virtual venue a perspective view of said virtual feature or object overlaid on said virtual venue, including viewing said virtual feature or object on a display of the glasses; and
   viewing on the glasses an artificial message geo-referenced to a virtual location or virtual object on said perspective view showing said information of said feature on said virtual venue.

30. The method of claim 29, wherein said server includes demographics and said artificial message includes an advertisement deemed relevant to such demographics.

31. The method of claim 29, wherein said server includes information personal to said sport participant and said artificial message includes an advertisement deemed relevant to said personal information.

32. The method of claim 29, wherein said artificial message includes an icon and the sport participant can activate a purchase by selecting said icon.

33. The method of claim 29, wherein said artificial message includes a coupon that can be selected and stored for later use on said device.

* * * * *